United States Patent
Nishitani et al.

(10) Patent No.: US 8,125,427 B2
(45) Date of Patent: Feb. 28, 2012

(54) LIQUID CRYSTAL DISPLAY DEVICE FOR DISPLAYING VIDEO DATA

(75) Inventors: Shigeyuki Nishitani, Yokohama (JP); Takeshi Maeda, Yokosuka (JP); Kazuyoshi Kawabe, Fujisawa (JP); Hiroshi Kurihara, Mobara (JP); Tetsuo Takagi, Yokohama (JP); Toshiaki Ohashi, Fujisawa (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 723 days.

(21) Appl. No.: 12/245,087

(22) Filed: Oct. 3, 2008

(65) Prior Publication Data

US 2009/0040157 A1    Feb. 12, 2009

Related U.S. Application Data

(60) Division of application No. 11/038,105, filed on Jan. 21, 2005, now Pat. No. 7,432,897, which is a continuation of application No. 09/816,077, filed on Mar. 26, 2001, now Pat. No. 6,850,214.

(30) Foreign Application Priority Data

Mar. 27, 2000  (JP) ................................ 2000-090699

(51) Int. Cl.
    *G09G 3/36*    (2006.01)
(52) U.S. Cl. ............................. 345/87; 345/88; 345/204
(58) Field of Classification Search .................. 345/87, 345/88–89, 204
    See application file for complete search history.

(56) References Cited

U.S. PATENT DOCUMENTS

| | | | | |
|---|---|---|---|---|
| 5,245,450 | A | * | 9/1993 | Ukai et al. ..................... 349/144 |
| 5,748,802 | A | | 5/1998 | Winkelman |
| 6,084,567 | A | | 7/2000 | Ogawa |
| 6,235,438 | B1 | | 5/2001 | Suzuki et al. |
| 6,278,496 | B1 | | 8/2001 | Kitagawa et al. |

(Continued)

FOREIGN PATENT DOCUMENTS

EP    0 516 084 A2    12/1992

(Continued)

OTHER PUBLICATIONS

"Changing the Maximum Brightness in Accordance with the Screen", Nikkei Electronics, Nov. 1999, No. 757, pp. 139-146.

*Primary Examiner* — Richard Hjerpe
*Assistant Examiner* — Leonid Shapiro
(74) *Attorney, Agent, or Firm* — Antonelli, Terry, Stout & Kraus, LLP.

(57) ABSTRACT

A liquid crystal display device for displaying video data having a detection circuit for detecting a luminance distribution based on video data which is inputted, the luminance distribution being indicative of generation frequency of gradations in each of divided region which includes a plurality of gradations. The display device includes a determination circuit for determining at least one of a plurality of divided regions of higher generation frequency of gradation than that of other divided regions based on the luminance distribution, a correction circuit for correcting the video data so as to make a luminance characteristic of the at least one of the plurality of divided regions of higher generation frequency of gradation more abrupt than a luminance characteristic of the other divided regions, and a liquid crystal display panel for displaying the corrected video data. A width of the divided region is changeable.

3 Claims, 21 Drawing Sheets

U.S. PATENT DOCUMENTS

| | | | |
|---|---|---|---|
| 6,373,533 B1 * | 4/2002 | Kawabata et al. | 348/672 |
| 6,600,470 B1 | 7/2003 | Tsuda | |
| 2002/0033830 A1 | 3/2002 | Yamakawa | |

FOREIGN PATENT DOCUMENTS

| | | |
|---|---|---|
| JP | 6-027901 | 2/1994 |
| JP | 06-230760 | 8/1994 |
| JP | 06-233131 | 8/1994 |
| JP | 6-311394 | 11/1994 |
| JP | 6-332398 | 12/1994 |
| JP | 06-350943 | 12/1994 |
| JP | 7-162715 | 6/1995 |
| JP | 7-281633 | 10/1995 |
| JP | 7-322176 | 12/1995 |
| JP | 7-322179 | 12/1995 |
| JP | 8-023460 | 1/1996 |
| JP | 11-109317 | 4/1999 |
| KR | 99-0080839 | 11/1999 |

\* cited by examiner

LIQUID CRYSTAL DISPLAY DEVICE FOR DISPLAYING VIDEO DATA

CROSS REFERENCE TO RELATED APPLICATION

This is a divisional application of U.S. Ser. No. 11/038,105, filed Jan. 21, 2005 now U.S. Pat. No. 7,432,897, which is a continuation of U.S. application Ser. No. 09/816,077, filed Mar. 26, 2001, now U.S. Pat. No. 6,850,214, the subject matter of which is incorporated by reference herein.

BACKGROUND OF THE INVENTION

This invention concerns a display device for displaying video data (including image data and text data); and, more particularly, the invention relates, for example, to a liquid crystal display device, CRT (Cathode Ray Tube) display device, plasma display device or EL (Electroluminescence) display device.

Existent color conversion methods for converting video data received from video signal generation devices, and the conversion devices therefor, have been adapted, as disclosed, for example, in J-P-A No. 11-275375, to set correction values to lattice point data for strengthening positions in a possible range of color values after conversion to a poly-dimension lookup table so as to allow values out of the possible range for the color values after conversion, to thereby conduct desired color conversion as much as possible, input color signals for color conversion to an address generation section upon color conversion and conduct interpolation by an interpolation operation section based on lattice point data outputted from the poly-dimension lookup table to obtain color values after conversion corresponding to the inputted color signals, and, when the color values after conversion are out of the possible range, convert them to boundary values by a gradation conversion section.

However, although the technology described above involves a basic concept of setting lattice point color values for the boundary portions of a possible range for the color values after conversion to the poly-dimension lookup table and conducting an operation for the portion between lattice points, thereby enabling color conversion without increasing the capacity of the lookup table, it does not mention a lookup table setting means for analyzing input video data to produce an optimal display corresponding to the condition of the input video data.

Further, although the technology described above involves a color conversion method for video data based on the setting of a lookup table and an operation method for the lattice points based on a set value, it does not describe means for obtaining a satisfactory display, for example, by combining back light control.

As another technique, it has been known to expand a bright gradation or dark gradation by a γ-correction circuit corresponding to a high or low level of APL (Average Picture Level) of video signals to improve the contrast of display images in a liquid crystal display device. For example, a γ-correction circuit described in J-P-A No. 6-6820 has a γ-correction memory that stores γ-correction data for white level expansion and a γ-correction memory that stores γ-correction data for black level expansion and selects one of the γ-correction memories depending on whether the APL of the video signals is higher or lower than a predetermined value, to conduct γ-correction for the video signal. This can expand the bright gradation or dark gradation in accordance with a high or low level of APL in the video signal and can improve the contrast of the displayed images in the liquid crystal display device.

Video signals displayed on the liquid crystal display devices includes video images of television broadcasting, as well as video signals regenerated from VTR or DVD, video images photographed by video cameras and video images prepared by computer graphics. Further, since the number of broadcasting channels has been increased greatly by transfer from existent analog broadcasting to digital broadcasting, such as satellite broadcasting, video signal sources have become more and more versatile. Further, such versatile video signals have been introduced also in computers in addition to existent television broadcasting, where they are displayed as display data of computers, and, further, such video signals will be processed and fabricated and displayed on display devices.

In a case of displaying such versatile video signals on liquid crystal display devices, various kinds of γ-correction memories have to be provided corresponding to gradation characteristics for all sorts of video signals in the prior art, which is adapted to select one of plural γ-correction memories previously provided in accordance with a high or low APL in the video signals to conduct γ-correction for the image signals. Further, video image scenes actually change sequentially and currently with time for video signals, but provision of a number of γ-correction memories optimal to each of the video image scenes requires a great amount of memory capacity resulting in an increase of the cost, and so it is not practical. Further, in the selection of the γ-correction memory in accordance with the APL in the video signals, one identical γ-correction memory is selected for different video image scenes so long as the APL is identical. However, in the case of a low APL, for instance, this means that an identical γ-correction is applied irrespective of the fact that the entire screen shows a dark video image scene on average, or a video image scene in which a bright area is locally present in entirely a dark area. While γ-correction should be different between such cases, the γ-memory is selected in accordance with the APL in the video signals in the prior art, so that fine γ-correction depending on the video image scenes can not be conducted.

Furthermore, in CRTs used generally so far as display devices, electric signal and brightness are in a $n^{2.2}$ but the liquid crystal display device has a characteristic such that the relation between the amount of light transmitting the liquid crystal and the electric signal is saturated both in a dark area and a bright area, as shown in FIG. 25. Thus, it is necessary to conduct γ-correction for a video signal while taking such a characteristic, which is inherent to the liquid crystal display device, into consideration.

SUMMARY OF THE INVENTION

This invention intends to provide an appropriate contrast in accordance with video data and provide a liquid crystal display device that is capable of clearly displaying video images.

Further, this invention intends to provide a liquid crystal display device that is capable of clearly displaying video images by obtaining an appropriate light amount from a back light in accordance with video data.

Further, this invention intends to provide a liquid crystal display device which is capable of improving the efficiency of utilizing the light of a back light, or is capable of reducing the electric power consumption for lighting up the back light, by obtaining an appropriate amount of light from the back light in accordance with the video data.

In accordance with this invention, a luminance characteristic relative to the gradation of inputted video data is detected, the gradation is corrected in accordance with the luminance characteristic and the corrected gradation is displayed on a liquid crystal panel.

Preferably, the gradation is corrected such that the luminance of a gradation of higher generation frequency than other gradation is relatively higher compared with that of the other gradation.

Preferably, the gradation is corrected so as to emphasize black as a color when a gradation of higher generation frequency is situated on the side of a gradation of relatively lower level in the luminance characteristic.

Preferably, the gradation is corrected so as to emphasize white as a color when a gradation of higher generation frequency is situated on the side of a gradation of relatively higher level in the luminance characteristic.

Preferably, the gradation is corrected such that the luminance of a gradation containing a maximum luminance value in the luminance characteristic approaches a maximum luminance value that the liquid crystal panel can display.

Preferably, the gradation is corrected such that the luminance of a gradation containing a minimum luminance value in the luminance characteristic approaches a minimum luminance value that the liquid crystal panel can display.

Further, in accordance with this invention, a luminance characteristic relative to the gradation of inputted video data is detected and the amount of light of a back light is controlled in accordance with the luminance characteristic.

Preferably, when luminance in one or plural frames is lower compared with the luminance in another one or plural frames, the amount of light of a back light is decreased relatively.

Preferably, when luminance in one or plural frames is higher compared with the luminance in another one or plural frames, the amount of light of the back light is increased relatively.

BRIEF DESCRIPTION OF THE DRAWINGS

The above-described and other objects, advantages and novel features of this invention will become more apparent from the following description in this specification when taken in conjunction with the accompanying drawings, wherein.

DETAILED DESCRIPTION OF THE PREFERRED EMBODIMENTS

A first embodiment of this invention will be explained with reference to the drawings.

Figure 1:
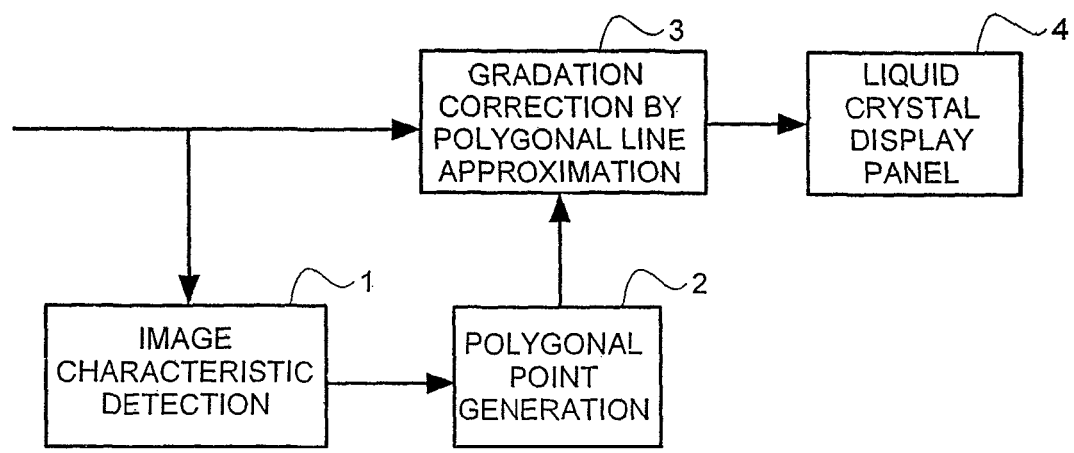
FIG. 1 is a block diagram of a system for a display device representing a first embodiment according to this invention.

FIG. 1 is a block diagram illustrating a first embodiment of a display system using the technique according to this invention.

In FIG. 1, there are a video image characteristic detection section 1 for measuring the luminance characteristic of video signals, such as luminance distribution, maximum luminance, minimum luminance and average luminance of RGB video signals; a polygonal point generation section 2 for calculating a correction control point for gradation correction from the luminance characteristic of the video signals detected by the input video image characteristic detection section 1; a polygonal line approximation gradation correction section 3 for correcting the luminance characteristic of RGB video signals by the gradation correction control point generated by the polygonal point generation section 2; and a liquid crystal display panel 4 for displaying RGB video signals corrected with the gradation characteristic.

This invention is described to determine the luminance characteristic of video signals, such as luminance distribution, maximum luminance or minimum luminance and average luminance on every 1 frame of the video signals inputted from television broadcasting, a personal computer, a video tape recorder (VTR) and a DVD player, thereby determining the gradation characteristic for every 1 frame, and to conduct gradation correction to the video signals based on the determined gradation characteristic and display the same on a liquid crystal display device, to thereby improve the conspicuous or clear impression of the displayed image quality. A detailed constitution and the operation of a first embodiment according to this invention will be explained with reference FIG. 2 through FIG. 14.

Figure 2:
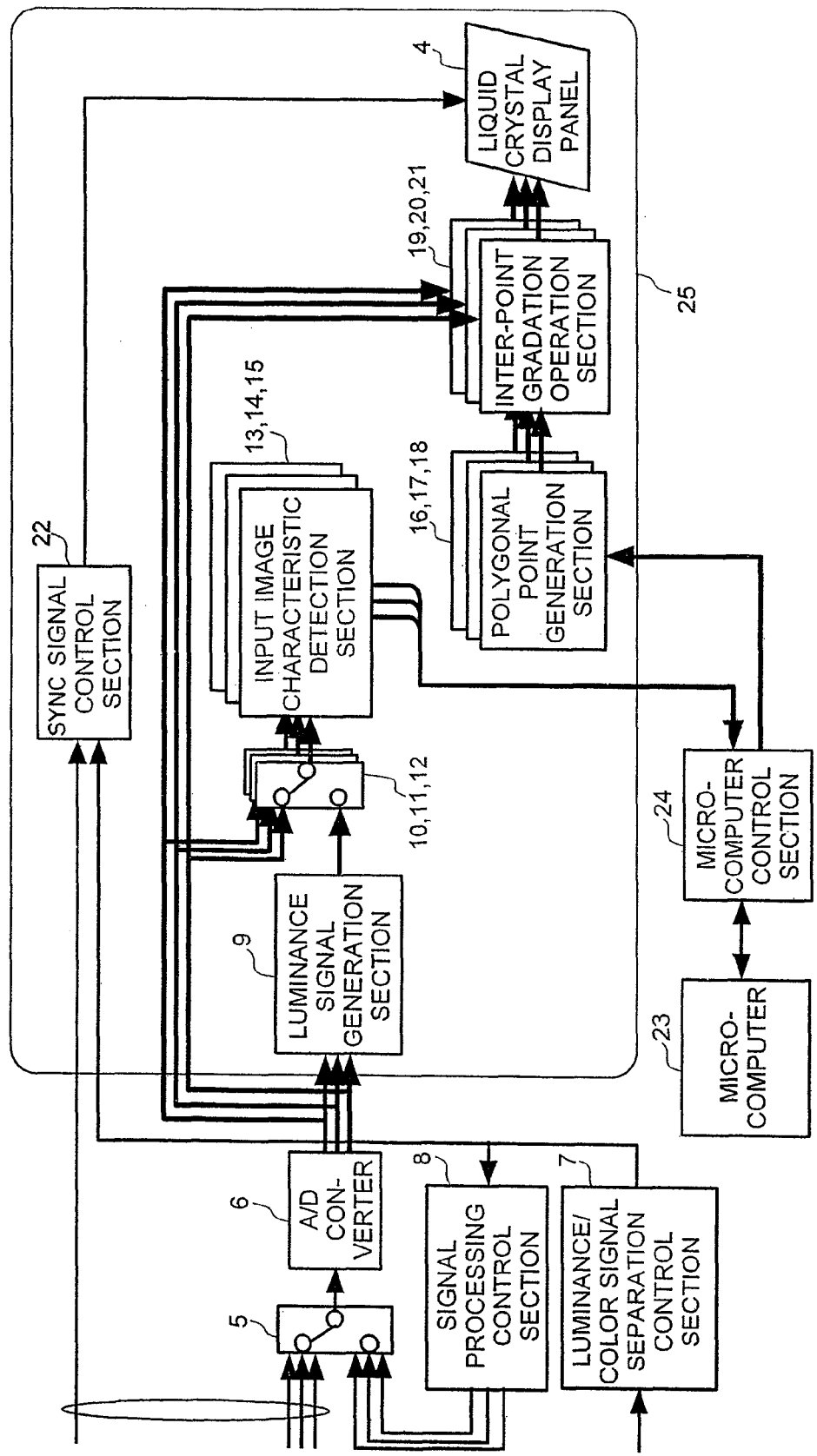
FIG. 2 is a more detailed block diagram a system for a display device representing first embodiment according to this invention.

In FIG. 2, there are a switching circuit 5 for switching RGB analog video signals received from a personal computer (hereinafter referred to as PC) and composite signals received from a video tape recorder converted into RGB signals, an A/D converter for converting the RGB analog output from the switching circuit 5 into digital data; a luminance/color signal separation control section 7 for separating the composite signals from the video tape recorder or the like into a luminance signal and color signals; a signal processing control section 8 for converting the luminance signals and color signals received from the separation control section 7 into a RGB signal; a luminance signal generation section 9 for generating digital luminance data from the digital RGB signals received from the AND converter 6; switching circuits 10-12 for switching the RGB output from the A/D converter 6 and the luminance signal output (Y) from the luminance signal generation section 9; input video data characteristic detection sections (hereinafter referred to as "input video image characteristic detection section") 13-15 for detecting the characteristic of the input video signals in an arbitrary period from the output received from the switching circuits; polygonal point generation sections 16-18 for generating output gradation data of each of the region boundaries upon dividing the inputted entire gradation region into arbitrary regions; inter-point gradation operation sections 19-21 for determining the gradation characteristic between the polygonal line points of adjacent gradation regions; a sync signal control section 22 for synchronizing horizontal, vertical and blanking period signals in the input signals received from a PC or composite with the output timing; a microcomputer 23 for overall control of this control device; and a display panel 4 using liquid crystal or the like as an example of a display medium. The liquid crystal module (display device) 25 includes the luminance signal generation section 9, the switching circuits 10-12, the input video image characteristic detection sections 13-15, the polygonal point generation sections 16-18, the inter-point gradation operation sections 19-21, the sync signal control section 22 and the display panel 4. Since the polygonal point generation sections 16-18 convert the gradation characteristic of the input video signal in accordance with the input video signals, it can be said that the circuits operate as gradation correction coefficient generation sections that generate a correction coefficient for correcting the input video signals based thereon. The inter-point gradation operation sections 19-21 output data corrected by the correction coefficient generated from the gradation correction coefficient generation section relative to the input video signals.

The entire operation of the first embodiment according to this invention will be described with reference to FIG. 2.

At first, the switching circuit selects signals of an RGB analog video image input such as from a PC or composite video image input such as from a video tape recorder and converted into RGB analog signals. For converting the composite video image input into RGB analog video signals, the input is at first separated into luminance signals and color signals in the luminance/color signal separation processing section 7, and then the signals are processed into color difference signals by the signal processing control section 8 and then converted into RGB analog signals and outputted. RGB analog video signals selected by the switching circuit 5 are converted by the A/D converter 6 into digital signals and then inputted to the switching circuits 10-12 and also to the luminance signal generation section 9.

The luminance signal generation section a determines a luminance value (Y) on every picture element (the picture element is data for R, G and B together) from the inputted RGB digital video data and outputs the results to the switching circuit 10-12. The switching circuits 10-12 select either the RGB video data from the A/D converter 6 or the luminance data (Y) from the luminance signal generation section 9 and output the same to the input video image characteristic detection sections.

The input video image characteristic detection sections 13-15 are circuits for detecting the luminance characteristic of the video signal appearing in one frame, such as a luminance distribution expressing the ratio for each luminance, the max min luminance and the average luminance in every one frame from the RGB video data or the luminance data (Y). Then, upon detection of the luminance characteristic from the RGB video data, the characteristic for all colors can be detected by providing three systems of identical circuits for each color; and, on the other hand, upon detection of the luminance characteristic from the luminance data (Y) from the luminance signal generation circuit 9, the characteristic for all picture elements can be determined by one system of circuits. The input video image characteristic detection sections 13-15 detect the gradation distribution characteristic, gradation maximum value minimum value and the gradation mean value from the inputted RGB video data or luminance data (Y) inputted in every frame and output them to the microcomputer control section 24. In a case where the video data changes frequently, such as in dynamic images from a video tape recorder, the luminance characteristic of the video signals is detected in every frame, and in a case where the motion is relatively small, as in the video images from a PC, the luminance characteristic of the video signals can be detected for plural frames as one period.

Then, detected data showing the luminance characteristic of the video signals detected in the input video image characteristic detection sections 13-15 are sent to the microcomputer control section 23. The microcomputer control section 24 outputs the detected data from the input video image characteristic detection sections 13-15 to the microcomputer 23 in accordance with the demand from the microcomputer 23. The microcomputer 23 generates polygonal line point data based on the detected data and outputs this data to the microcomputer control section 24. The method of generating the polygonal line point data will be detailed later. The microcomputer control section 24 outputs the polygonal line point data to polygonal point generation sections 16-18.

The polygonal point generation sections 16-19 output polygonal line point data from the microcomputer control section 24 to the inter-point gradation operation sections 19-21. The inter-point gradation operation sections 19-21 convert the gradation characteristic of the RGB digital video data from the A/C converter 6 in accordance with the polygonal line point data and output the gradation data after conversion to the display panel 4. Since the digital video data from the A/D converter 6 are different for R, G and B in each case of the detection modes for the input video data characteristic, that is, in a case of detection for each of R, G and B colors and in a case of detection for the luminance data (Y) from the luminance signal generation section 9, each of the inter-point gradation operation sections 19-21 comprises three systems of circuits.

Details of the functions carried out in each of the sections will be explained.

Figure 3:
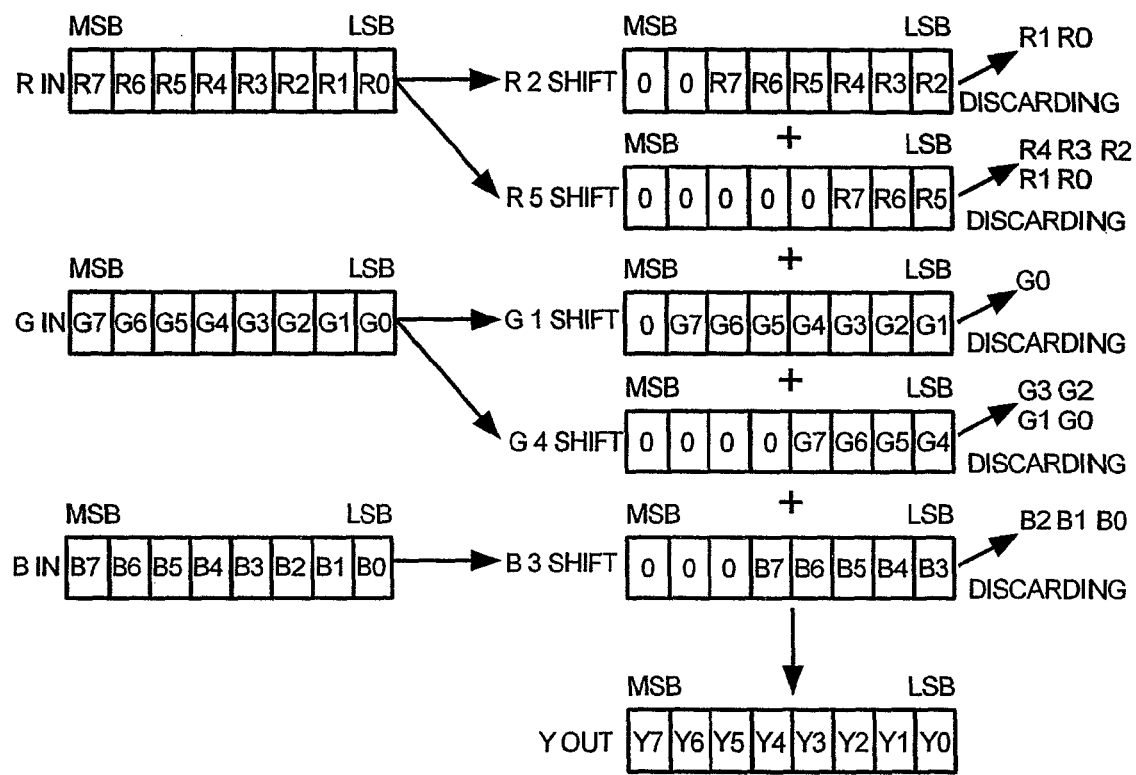
FIG. 3 is a diagram of a luminance signal generation section in a first embodiment according to this invention.

FIG. 3 is a diagram illustrating the operation of the luminance signal generation section 9 in a first embodiment. The ratio between each of the colors in a case of generating the luminance data (Y) from the RGB video data is expressed, for example, by the following equation:

$$\text{Luminance Data}(Y) = 0.299 \times R(\text{red}) + 0.587 \times G(\text{green}) + 0.144 \times B(\text{blue})$$

The equation for calculating the luminance data (Y) is based on an operation for the sum of products of the RGB video data, each appended with a real number coefficient, and it is difficult to process the same exactly using hardware in view of the increase in the scale of the circuits and the lowering of the processing speed which results. Thus, the operation is simplified for easy attainment of the operation for the sum of products using the hardware. Since the generated luminance data per se are not the display data, but are used for obtaining the characteristic of the display data, this is attained by bit shifting and addition processing. In FIG. 3, the following approximation processing to the equation described above is enabled assuming that each of R, G and B is 8 bit digital video data. This processing is performed by rightward shifting of the R color data each by 2 bits and 5 bits (rightward shifting by one bit for division by 2, rightward shifting by n bits for division by $2^2$), rightward shifting of the G color data each by one bit and 4 bits, and rightward shifting of B color data by 3 bits and by adding all of the shift data.

$$\text{Luminance Data}(Y) = 0.281 \times R(\text{red}) + 0.563 \times G(\text{green}) + 0.125 \times B(\text{blue})$$

Since the operation processing for generating the luminance data (Y) can be simplified as described above, the simplification can be attained easily using hardware. Alternatively, it may be attained also by software.

Now, detailed constitution and operation of the input video image characteristic detection sections 13-15 in FIG. 2 will be explained with reference to FIG. 4.

Figure 4:
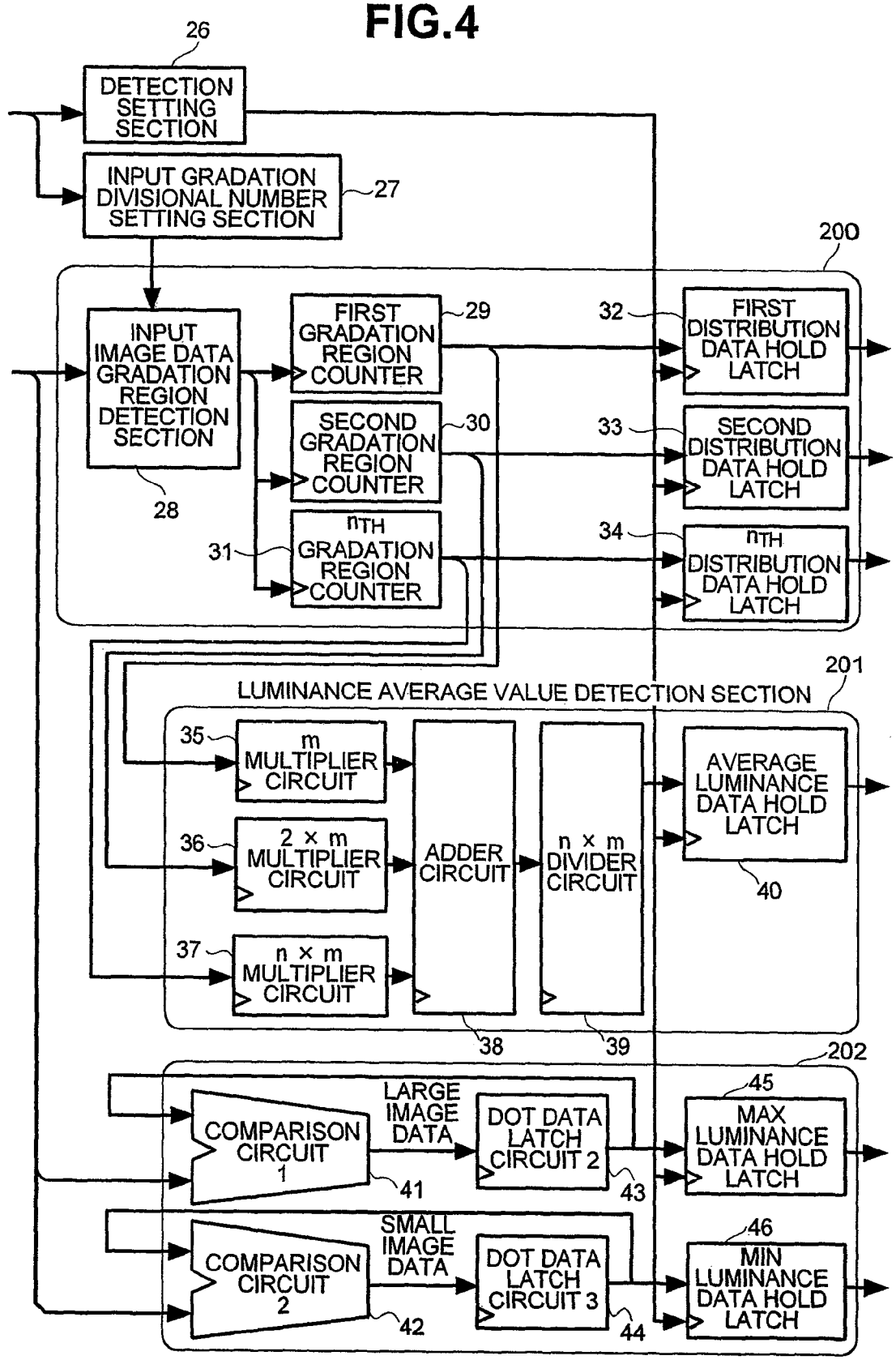
FIG. 4 is a block diagram of an input video image characteristic detection section in the first embodiment according to this invention.

In FIG. 4, there are a detection setting section 26 for setting the detection period at first; an input gradation divisional number setting section 27 for setting a divisional number in the entire input gradation region; an input image data gradation region detection section 28 for detecting the correspondence of the input video data to each of the divisional regions set by the input gradation divisional number setting section 27; a first gradation region counter 29 for counting the data in the region of the lowest gradation; a second gradation region counter 30 for counting the data in the region of the gradation next to the lowest; an $n_{th}$ gradation region counter 31 for counting the data in the region of the highest gradation; a first distribution data hold latch 32 for holding the total number of data in the region for the lowest gradation in the detection period for once; a second distribution data hold latch 33 also for holding the total number of data in the second region; an $n_{th}$ distribution data hold latch 34 for holding the total number of data in the region for the highest gradation; an n multiplier circuit 35 for multiplying the counted value of the first gradation region counter 29 by the factor of m; a 2*m multiplier circuit 36 for multiplying the counted value of the second gradation region counter 30 by the factor of 2*m; an n*m multiplier circuit 37 for multiplying the counted value of the nth gradation region counter 31 by the factor of n*m; an adder circuit 38 for adding output data from each of the multiplier circuits; an n*m divider circuit 39 for dividing the output from the adder circuit 38 by the factor of n*m; an average luminance data hold latch 40 for holding the output from the divider circuit 39 as an average luminance value; a comparison circuit 41 for comparing the video data under serial transmission with the output of a dot data latch circuit 43 to be described later and selecting and outputting larger data; a comparison circuit 42 for comparing the video data under serial transmission with the output of a dot data latch circuit 43 to be described later and selecting and outputting smaller data; a dot data latch circuit 43 for latching the output from the comparison circuit 41; a dot data latch circuit 44 for latching the output of the comparison circuit 42; a maximum luminance data hold latch 45 for holding the maximum luminance data as the output data from the dot data latch circuit 43 in an arbitrary period set by the detection setting section 26; and a minimum luminance data hold latch 46 also for holding the minimum luminance data as output data from the dot data latch circuit 44 in the arbitrary period set by the detection setting section 26.

The luminance distribution detection section 200 for detecting the luminance distribution of the input image data comprises the input video data gradation region detection section 28, the first gradation region counter 29, the second gradation region counter 30, the $n_{th}$ gradation region counter 31, the first distribution data hold latch circuit 32, the second distribution data hold latch 33 and the n$_{th}$ distribution data hold latch 34. The luminance average value detection section 201 for detecting the average luminance of the input video data comprises the m multiplier circuit 25, 2*m multiplier circuit 36, the n*m multiplier circuit 37, the adder circuit 38, the n*m divider circuit 39 and the average luminance data hold latch 40. The luminance max min value detection circuit 202 for detecting the maximum value and/or minimum value for the luminance of the input video data comprises the comparison circuits 41, 42, the dot data latch circuits 43, 44, the maximum luminance data hold latch 45 and the minimum luminance data hold latch 46.

At first, the detection period is set to the detection setting section 26 under the control of the microcomputer control section 24. In this embodiment, since the contents of the display change every frame as in video signals, an explanation will be made for the case where the detection period is set as one frame. In a case where the contents of the display change very little, as in a personal computer, the detection period may be set as plural frames. The output from the detection setting section 26 forms a latch clock for the final stage data hold latch in each of the detection function sections, as will be described later. On the other hand, the number for dividing the magnitude of the brightness of the input image data (for example, luminance data (Y)) is set by the input gradation divisional number setting section 27 under the control of the microcomputer control section 24. As an example, the entire input region is defined as having 256 gradations (8 bit) and the divisional number is set as 8 for division. The output from the input gradation divisional number setting section 27 is inputted to the input video data gradation region detection section 28, which judges the correspondence of the gradation value of the input video data to each of the divisional regions from the input gradation divisional number setting section 27 and outputs a clock for the region counter corresponding to the region. Since the entire input gradation region includes 256 gradations and the divisional number is 8 in this example, the gradation range in each of the regions is a region on all 32 gradations. Accordingly, the characteristic detection accuracy for the input video signals can be improved by making the divisional number larger and the number of gradation smaller in each of the divisional regions, but, since improvement for the accuracy may also lead to increase of the circuits, the accuracy may be changed depending on the application use. The luminance distribution is detected by counting the number of data on every gradation region in the first gradation region counter 29, the second gradation region counter 30 and the nth gradation region counter 31 by the clock from the input video data gradation region detection section 28 and holding the same as the luminance distribution data by the first distribution data latch circuit 32, the second distribution data hold latch 33 and the n$_{th}$ distribution data hold latch 34 during the period set by the detection setting section 26.

For the detection of the average luminance value, the average luminance is detected on every frame by multiplying each of the outputs from the first gradation region counter 29, the second gradation region counter 30 and the n$_{th}$ gradation counter 31 by the m·multiplier circuit 35, the 2:m·multiplier circuit 36 and the n*m·multiplier circuit 37, respectively, adding each of the outputs using the adder circuit 38, dividing the output by the n*m·divider circuit 39 and holding the output for the period set by the detection setting section 29 (during 1 frame in this embodiment) as the average luminance data by the average luminance data hold latch 40. m represents the number of gradations in each of the divisional regions. As described above, since the input is set as 256 gradations and the number of divisions is set at 8, m is 32 in this embodiment. Accordingly, if each of the multiplier circuits 35-37 and the adder circuit 38 is constituted with 16 bits, the divider circuit 39 conducts division by: n*m=8*32=256, which can be attained by a simple logic of rightward shifting by 8 bits (selection for higher 8 bits).

For the maximum minimum value detection of the luminance, the input video data and the output from the dot data latch circuit 43 and the dot data latch circuit 44 each delayed by one clock thereto are inputted to the comparison circuit 41 and the comparison circuit 42, each of which judges the larger and the smaller data and outputs the same. That is, since the video data are sent serially, the output from dot data latch circuit 43 and the video data are compared in the comparison circuit 41 and larger data is always selected and outputted to the dot data latch circuit 43, and all video data for 1 frame are compared to obtain the maximum luminance data on every 1 frame. Further, the minimum luminance data can also be obtained in the same manner by the comparison circuit 42 and the dot data latch circuit 44. The output data are latched in the dot data latch circuit 43 and the dot data latch circuit 44, respectively, and the outputted maximum and minimum luminance data are held for one frame by the maximum luminance data hold latch 45 and the minimum luminance data hold latch 46, respectively, during the period set by the detection setting section 26, to detect the maximum luminance and the minimum luminance on every one frame.

Now, details of the polygonal point generation sections 16 to 18 shown in FIG. 1 or 2 will be explained with reference to FIG. 5.

Figure 5:
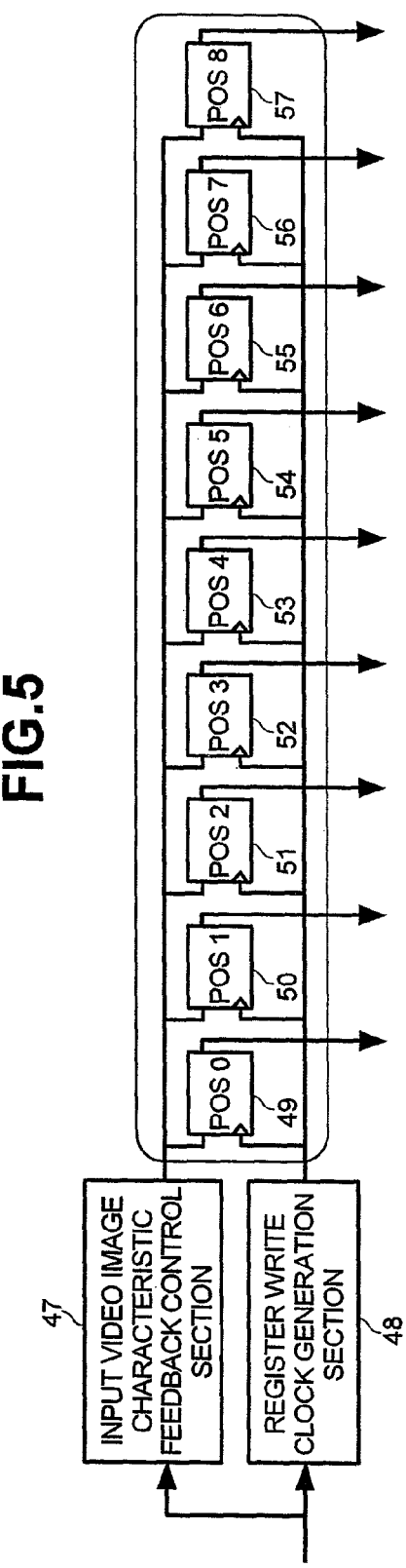
FIG. 5 is a block diagram of a polygonal line point generation section in the first embodiment according to this invention.

FIG. 5 is a block diagram showing the constitution of the polygonal point generation sections 16-18.

In FIG. 5, there are an input image characteristic feed back control section 47 for reflecting the input characteristic detected by the input video image characteristic detection sections 13-15 by way of the microcomputer control section 24 upon setting the polygonal line point; a register write clock generation section 48 for polygonal line point setting register; and polygonal line point setting registers 49-57 holding polygonal line points, respectively. While each of the polygonal point generation sections 16-18 includes three systems in FIG. 2, since all of the systems have the same constitution, a description will be made for one system in FIG. 5.

Figure 6:
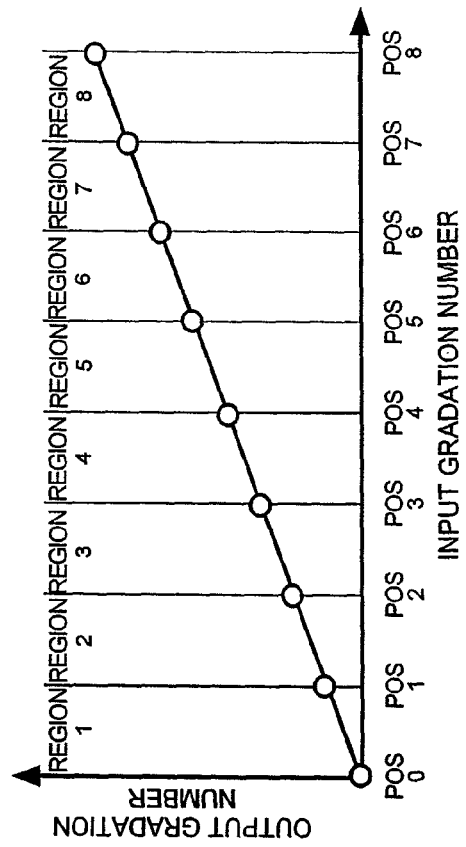
FIG. 6 is an input/output luminance characteristic graph in a polygonal line point generation section in the first embodiment according to this invention (first example of characteristic)

Further, in the description for FIG. 5, like that in the explanation for the input video image characteristic detection sections 13-15, an example of setting the number of input gradations to 256 gradations and dividing the entire input gradation region by 8 will be explained. At first, the first characteristic example not reflecting the result of detection by the input video image characteristic detection sections 13-15 will be explained. The first characteristic example is that of setting a characteristic equivalent between the input and the output irrespective of the result of the characteristic detection from the input video image characteristic detection sections 13-15. The input video image characteristic feedback control section 47 directly sets each of the polygonal line point master data received from the microcomputer control section 24. Accordingly, in the first characteristic example, linear characteristic data is directly set from the microcomputer control section 24. FIG. 6 shows the input/output gradation characteristic provided by this setting. In FIG. 6, the input/output equivalent (linear) characteristic is obtained by making the number of gradations between each of the divisional regions (the number of gradations for one divisional region=256/8=32 gradations). Details of the operation of the input video image characteristic feed back control section 47 for setting a linear characteristic will be explained specifically with reference to FIG. 7.

Figure 7:
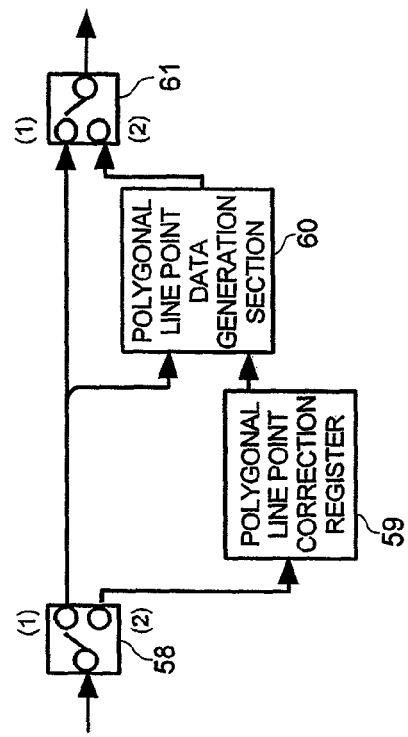
FIG. 7 is a block diagram of an input image characteristic feedback control section in the first embodiment according to this invention.

FIG. 7 is a block diagram of the input video image characteristic feed back control section 47. In FIG. 7, there are a switching circuit 58 for switching the polygonal line point correction data and the polygonal line point master data from the microcomputer control section 24; a polygonal line point correction data holding register 59; a polygonal line point data generation section 60 for generating the data from the polygonal line point correction data and the polygonal line point master data; and a switching circuit 61 for selecting the output from the switching circuit 58 or the polygonal line point data generation section 60. At first, for the first characteristic example for setting the linear characteristic shown in FIG. 6, the switching circuit 58 always selects (1) and the switching circuit 61 always selects (1). Accordingly, irrespective of the operation of the polygonal line point correction data holding register 59 and the polygonal line point data generation section 60, the polygonal point master data from the microcomputer data control section 24 is outputted directly as set data for the polygonal line point register and is set to the polygonal line point setting registers 49-57. The polygonal line point setting register 49 outputs polygonal line point 0, the polygonal line point setting register 50 outputs polygonal line point 1, the polygonal line point setting register 51 outputs the polygonal line point 2, the polygonal line setting register 52 outputs the polygonal line point 3, the polygonal line point setting register 53 outputs the polygonal line point 4, the polygonal line point setting register 54 outputs the polygonal line point 5, the polygonal line point setting register 55 outputs the polygonal line point 6, the polygonal line point setting register 56 outputs the polygonal line point 7 and the polygonal line point setting register 57 output the polygonal line point 8.

The first characteristic example of the linear input/output characteristic has been explained above and other examples of input/output characteristics will be explained below successively with reference to the drawings.

At first, as a second characteristic example, an example of setting the polygonal line point while reflecting the luminance distribution characteristic from the input video image characteristic detection sections 13-15 will be explained. The second characteristic example is that of emphasizing a gradation region of high generation frequency by increasing the output luminance relative to the input gradation region of the highest generation frequency in the detected luminance distribution characteristic.

Figure 8:
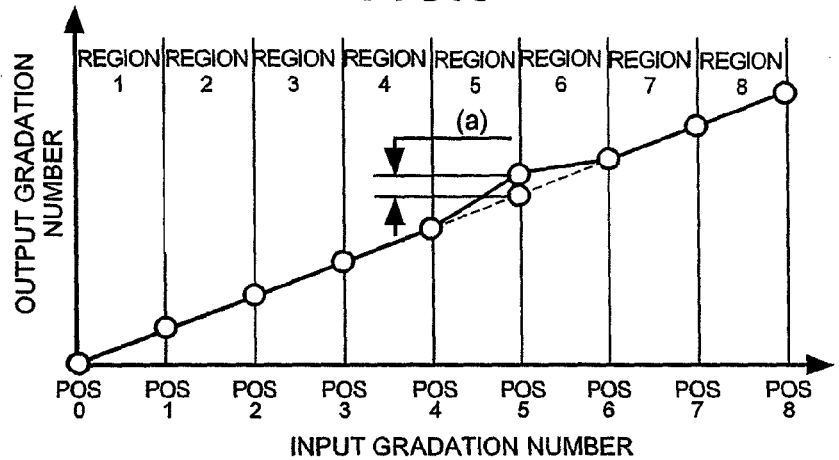
FIG. 8 is an input/output luminance characteristic graph in a polygonal point generation section in the first embodiment according to this invention (second characteristic example)

FIG. 8 shows an example of the input/output gradation characteristic set by the second characteristic example. In this example, the input video image characteristic detection sections 13-15 determine that the generation frequency of the input gradation data is highest in the divisional region 5 so as to emphasize the luminance characteristic in this region. That is, the microcomputer 23 determines the gradation region of the highest generation frequency based on the gradation data generation frequency detected by the luminance distribution detection section described with reference to FIG. 4. As a result, when the frequency is highest for the region 5, a gradation value (a) is set to the polygonal line point correction register 59 of the input image characteristic feed back control section 47 shown in FIG. 7 and the gradation data obtained by addition of the master data at the polygonal line point 5 and the set value for the polygonal line point correction register 59 is set to the polygonal line point 5 setting register 54 in the polygonal line point data generation section 60 by the control from the microcomputer 23. Since this makes the luminance characteristic in the region 5 even more abrupt, thereby to increase the contrast in the gradation region 5, video images can be emphasized further.

Then, as a third characteristic example, explanation will be made for an example of also setting the polygonal line point by reflecting the luminance distribution characteristic from the input video image characteristic detection sections 13-15. In this example, the input gradation region is divided into two groups consisting of a lower region (region 1-region 4) and a higher region (region 5-8) and controlled such that black as a color is emphasized where the region including greatest luminance distribution from the input video image characteristic detection sections 13-15 is in the lower region; and, on the contrary, white as a color is emphasized where such region is in the higher region. In this case, the operation where the region including the greatest luminance distribution is in the regions 5-8 is identical with the operation of the second characteristic example shown in FIG. 8, and so further explanation therefor will be omitted. On the other hand, the operation where the region including the greatest luminance distribution is in the regions 1-4 will be explained with reference to FIG. 9.

Figure 9:
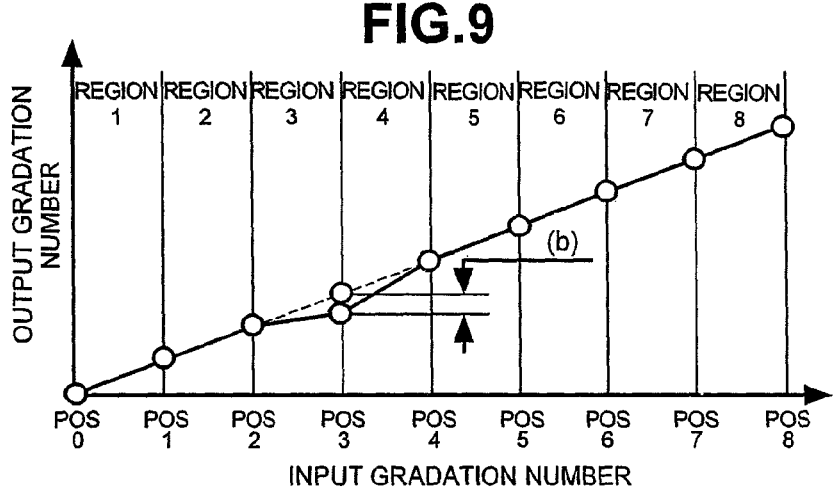
FIG. 9 is an input/output luminance characteristic graph in a polygonal point generation section in the first embodiment according to this invention (third second characteristic example)

FIG. 9 shows an input/output gradation characteristic example according to the third characteristic. In this example, the input video image characteristic detection sections 13-15 determines that the generation frequency of the input gradation data is highest for the divisional region 4. That is, in the same manner as the operation for the second characteristic example, the region of the highest generation frequency is judged by the control of the microcomputer 23. Since this is the region 4 in this example, the microcomputer 23 sets the correction gradation value (b) to the polygonal line point correction register 59 of the input video image characteristic feed back control section 47 shown in FIG. 7, and sets the gradation data obtained by subtracting the set value at the polygonal line point correction register 59 from the master data of the polygonal line point 3 to the polygonal line point 3 setting register 52. In this case, the polygonal line point data generation section 60 constitutes a subtraction circuit. Since this makes the luminance characteristic in the region 4 even more abrupt, thereby to increase the contrast of the region 4, the video images can be emphasized.

Now, as a fourth characteristic example, an example of combining the second and third characteristic examples will be explained. Also in this case, the polygonal line point is set by reflecting the luminance distribution characteristic from the input video image characteristic detection sections 13-15. The luminance distribution characteristic detection sections 13-15 control the divisional gradation regions including the greatest distribution and the next to the greatest distribution so as to emphasize the feature of the video data.

Figure 10:
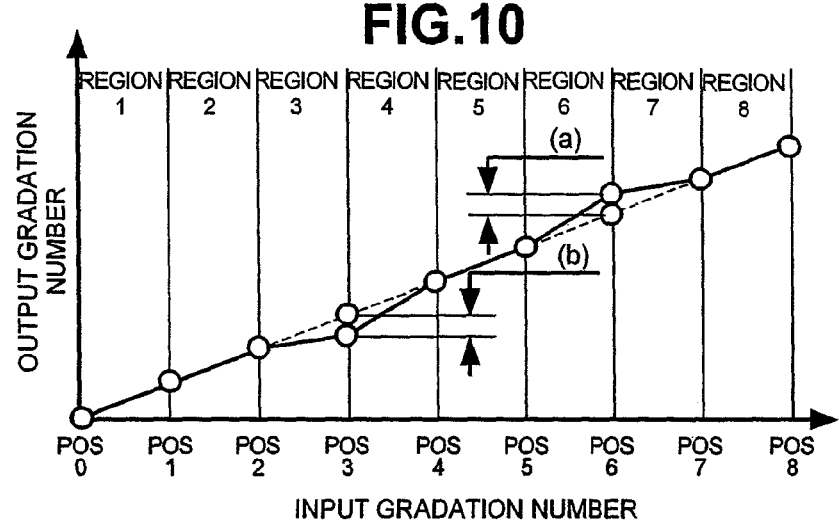
FIG. 10 is an input/output luminance characteristic graph in a polygonal point generation section in the first embodiment according to this invention (fourth characteristic example)

FIG. 10 shows an input/output gradation characteristic example according to the fourth characteristic. In this example, the generation frequency of the input gradation data is highest for the divisional region 6 and it is next to the highest for the divisional region 4 in the input video image characteristic detection sections 13-15. That is, it is controlled such that the feature of the divisional gradation regions including the greatest distribution and the next to the greatest distribution is emphasized, by adding the first correction value (a) for the polygonal line point correction register 59 and the master data of the polygonal line point 6 by the polygonal line point data generation section 60 for the divisional region 6, since this is a group of high input gradation region, while subtracting the second correction value (b) for the polygonal line point correction register 59 from the master data for the polygonal line point 3 by the polygonal line point data generation section 60, since this is a group of low input gradation region. In this case, the polygonal line point data generation section 60 constitutes both an addition circuit and a subtraction circuit.

As a fifth characteristic example, an example of setting the polygonal line point by reflecting the result for the detection of the maximum luminance value and the minimum luminance value from the input video image characteristic detection sections 13-15 will be described.

Figure 11:
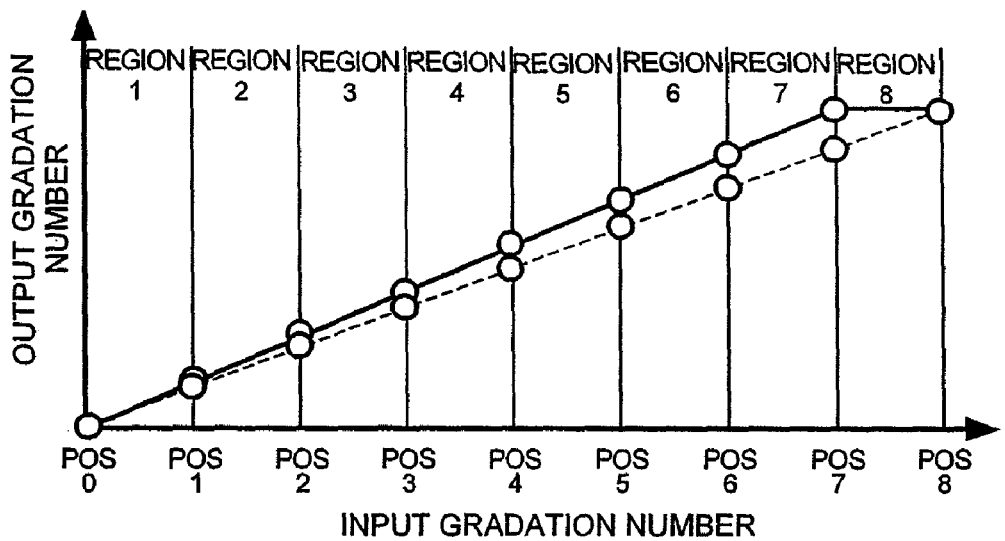
FIG. 11 is an input/output luminance characteristic graph in a polygonal point generation section in the first embodiment according to this invention (fifth characteristic example)

FIG. 11 shows an example of an input/output gradation characteristic reflecting the result of the maximum luminance detection. In this example, the dynamic range of the regions 1 to 7 is made largest when the maximum luminance is contained in the region of the divisional region 7 and is not present in the divisional region 8. For this purpose, the set value for the polygonal line point 7 is made equal to the set value for the polygonal line point 8 for the polygonal line points 0-7, by the input video image characteristic feedback control section 47 in FIG. 5, and the intersection between the boundary of each of the signal regions and a line connecting the polygonal line point 0 and the polygonal line point 7 is defined as each of the set values from the polygonal line point 1 to the polygonal line point 6. This can provide the display characteristic of making the entire luminance characteristic uniform and expanding the high luminance area, by utilizing the contrast of the display device to the utmost.

Figure 12:
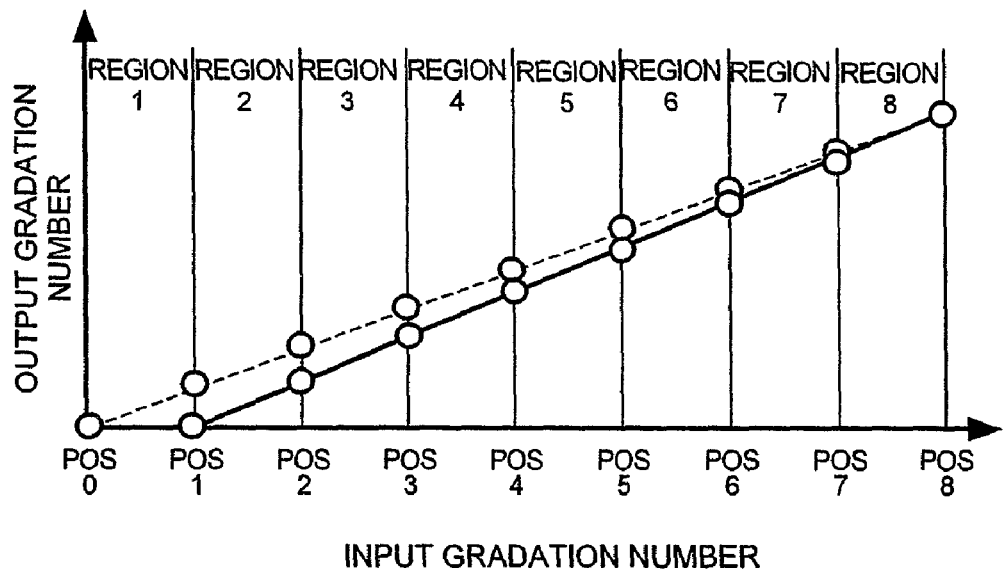
FIG. 12 is an input/output luminance characteristic graph in a polygonal point generation section in the first embodiment according to this invention (sixth characteristic example)

In the same manner, FIG. 12 shows an example of an input/output luminance characteristic reflecting the result of detection of the minimum luminance. In this example, the dynamic range is made largest when the minimum luminance is contained in the region for the divisional region 1 and not contained in the divisional region 0. That is, the set value for the polygonal line point 1 is made equal to the set value for the polygonal line point 0 and the intersection between the boundary for each of the divisional regions and a line connecting the polygonal line point 1 and the polygonal line point 8 is defined as each of the set values from the polygonal line point 2 to the polygonal line point 7. This can provide a display characteristic for the entire luminance characteristic is made uniform and the low luminance area is expanded by utilizing the contrast of the display device to the utmost.

As described above, a satisfactory display can be obtained by reflecting the result of detection from the input video image characteristic detection sections 13-15 to the luminance point generation sections 16-18 for the luminance characteristic provided to the video data, and various input/output gradation characteristics can be obtained. It will be apparent that the input gradation characteristic can be changed without reflecting the result of detection by the input video image characteristic detection sections 13-15.

The inter-point gradation operation sections 19-21 in FIG. 2 will be explained with reference to FIG. 13. The inter-point gradation operation sections 19-21 are used for converting the input gradation data into the inter-point output gradation data in accordance with the polygonal line points set by the polygonal point generation sections 16-18.

Figure 13:
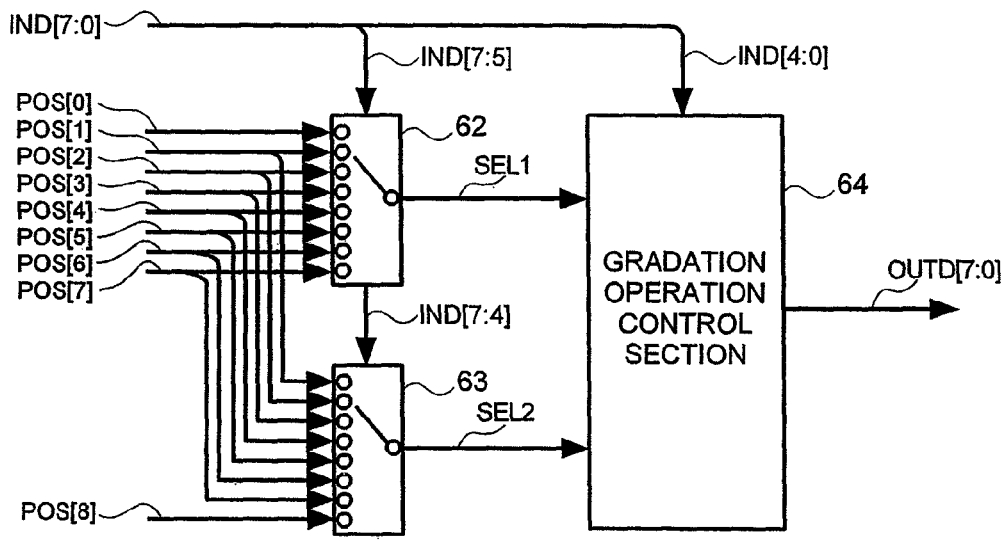
FIG. 13 is a schematic block diagram of an inter-point gradation operation section in the first embodiment according to this invention.

FIG. 13 shows an example of the inter-point gradation operation sections 19-21. Depending on the input form to the input video image characteristic detection sections 13-15, each of the inter-point gradation operation sections 19-21 has three systems when the data is inputted in RGB form so as to set the data independently of each other, or has one system when the data is inputted in the form of luminance data (Y) from the luminance signal generation section 9, since processing is conducted in common with R, G and B. In FIG. 13, there are a selector circuit 62 for selecting one of eight set values other than the uppermost gradation, among the polygonal line point set values received from the polygonal point generation sections 15-18; a selector circuit 63 for selecting one of eight set values other than the lowermost gradation, among the polygonal line point set values; and a gradation operation control section 64 for determining the inter-point gradation data from the polygonal line point set values selected by the selector circuit 62 and the selector circuit 63. In this illustrated example, the entire input gradation region is divided into eight portions and the input image data includes 256 gradations (8 bits) in the same manner as described above. Further, since the input video data is provided on eight bit basis, this data is indicated as IND [7:0]. Further, the polygonal points 0-8 are indicated, respectively, as POS0-POS8.

At first, the polygonal line point set values are selected by the selector circuit 62 and the selector circuit 63, respectively, by the higher 3 bits IND [7:5] in the input video data IND [7:0]. POS values are inputted to the selector 62 from the bottom in the order of register POS0 to POS7, while POS values are inputted to the selector 63 from the bottom in the order of registers POS1 to POS8. Accordingly, when the higher three bits IND [7:5] of the input image data are "000", the selector circuit 62 selects POS0 while the selector circuit 63 selects POS1. In the same manner, when the bits IND [7:5] are "001", the selector circuit 62 selects POS1 while the selector circuit 63 selects POS2. Subsequently, POS0-POS8 are selected in accordance with the value for bits IND [7:5] by the circuits 62 and 63 in the same manner. The set values selected by each of the selectors are inputted to the gradation operation control section 64, which conducts operation processing to obtain gradation data of the output video images. The gradation operation control section 64 conducts the operation, for example, in accordance with the following equation.

$$OUTD[7:0]=SEL1+(SEL2-SEL1)\times IND[4:0]/32$$

Figure 14:
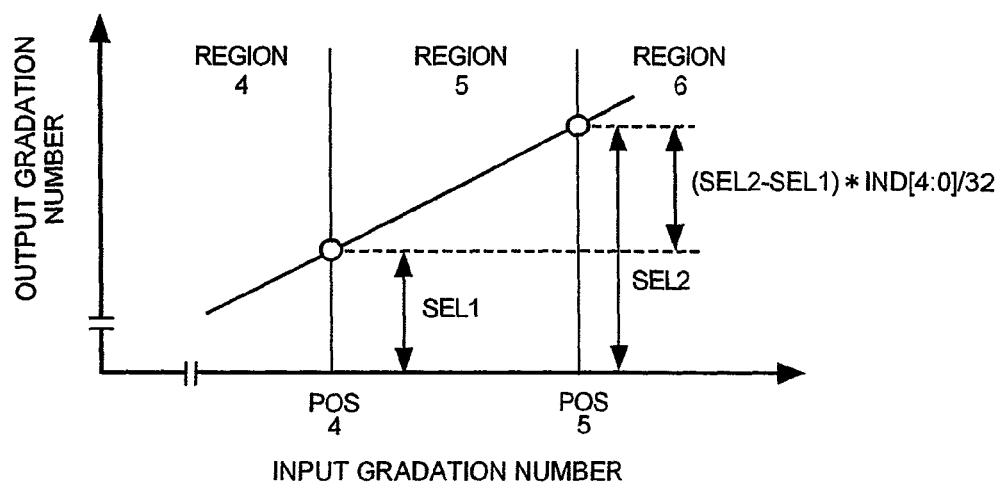
FIG. 14 is a conceptional diagram for illustrating the operation of the inter-point gradation operation section in the first embodiment according to this invention.

OUTD [7:0] is the gradation data after the operation as outputted from the gradation operation control section 64, SEL1 represents a polygonal line point selected by the selector 62 and SEL2 represents a polygonal line point selected by the selector 63. FIG. 14 shows a gradation characteristic graph illustrating the operation based on the equation described above, taking notice on one divisional region. Further, this shows a case when the higher 3 bits IND [7:5] of the input video data IND [7:0] are "100".

It can be seen that the selector 62 selects POS4, while the selector 63 selects POS5 in accordance with the operation of the inter-point gradation operation sections 19-21, and the input image data IND [7:0] are data in the region 5. Then, the gradation operation control section 64 calculates the output gradation OUTD [7:0] for the lower 5 bits IND [4:0] of the video data in accordance with the formula described above, connecting POS4 and POS5 by a linear line, and outputs them. The outputted data OUTD [7:0] are obtained by conversion of the input video data IND [7:0] in accordance with the characteristic as shown in FIG. 6, FIG. 8-FIG. 12, and the OUTD [7:0] are outputted to the display panel 4 and displayed as picture images.

As described above, according to the first embodiment of this invention, the luminance characteristic can be set in accordance with the gradation distribution characteristic and the maximum luminance and the minimum luminance of the input video data on every frame period; and, the video image can be displayed clearly, particularly by emphasizing the contrast in the gradation distribution region of the highest gradation frequency. Further, it is possible to attain a display while utilizing the contrast characteristic of the display device to the utmost in accordance with the maximum luminance and the minimum luminance.

In the first embodiment, the microcomputer 23 conducts processing so as to obtain a desired gradation characteristic based on the characteristic of the input video signals detected by the input video image characteristic detection sections 13-15 by using the microcomputer 23 and the microcomputer control section 24, and it controls the polygonal point generation sections 16-18 and the inter-point gradation operation sections 19-21, to convert the gradation characteristic of the input video signals and output the same to the display panel. On the other hand, for making the circuit structure simpler, the characteristic of the input video signals detected by the input video image characteristic detection sections 13-15 may be directly inputted to the polygonal point generation sections 16-18 without using the microcomputer 23 and the microcomputer control section 24. In this case, flexible control by the software of the microcomputer 23 is no longer utilized, and the control operation is fixed by the circuits, but the number of parts relevant to the microcomputer 23 can be reduced. Accordingly, the circuits of this embodiment can be incorporated in the liquid crystal module, and it is possible to attain a liquid crystal module capable of optimally setting the gradation characteristic by itself in accordance with the video signals.

Figure 15:
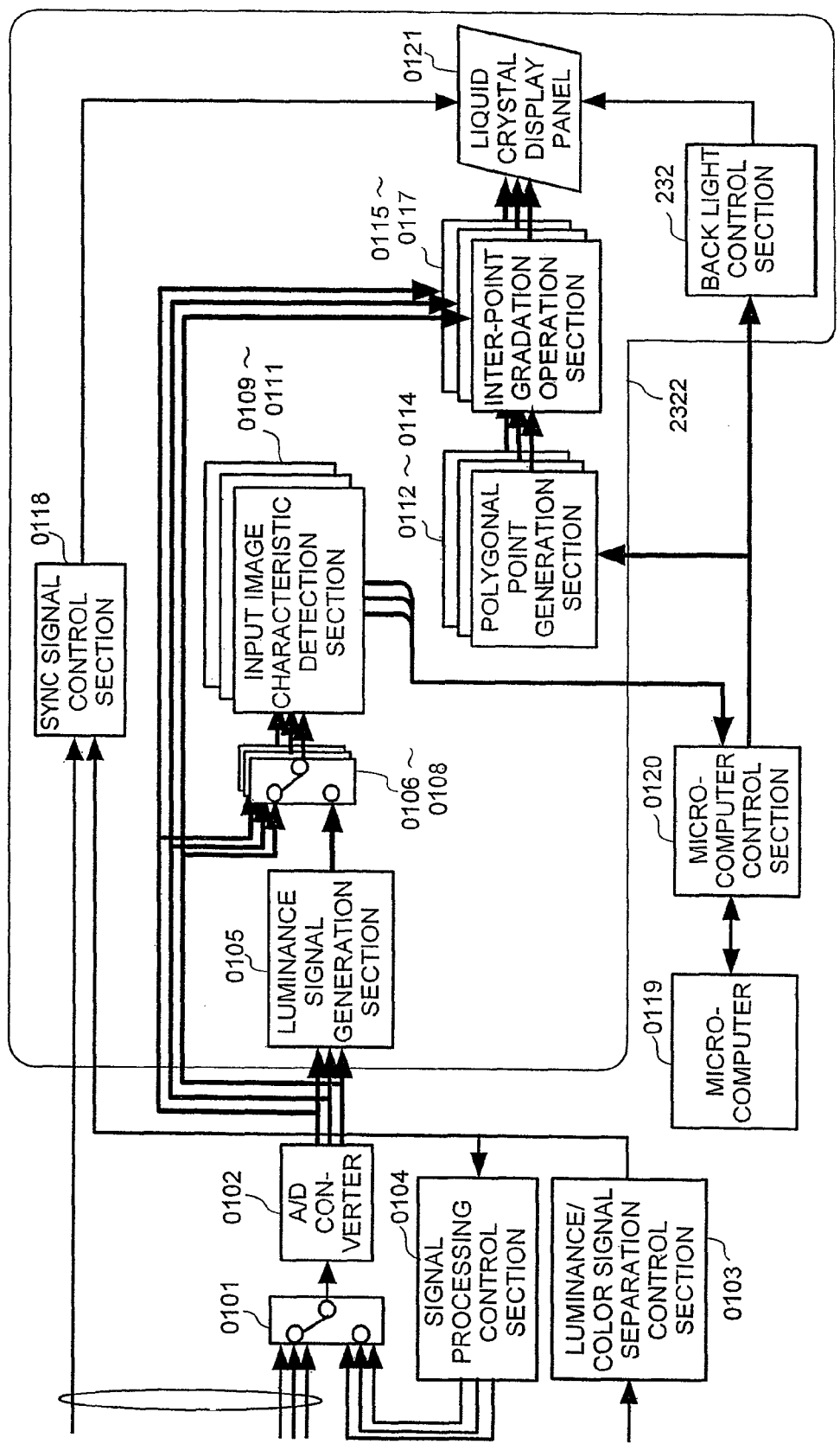
FIG. 15 is a block diagram of a system for a display device representing a second embodiment according to this invention.

FIG. 15 is a block diagram illustrating a second embodiment using the technique according to this invention.

This embodiment additionally comprises a back light control section 65 for controlling the amount of a light produced by a back light, in addition to the already-describe features of the first embodiment. Since other portions are identical with those described for the first embodiment, a further detailed explanation thereof will be omitted.

Figure 16:
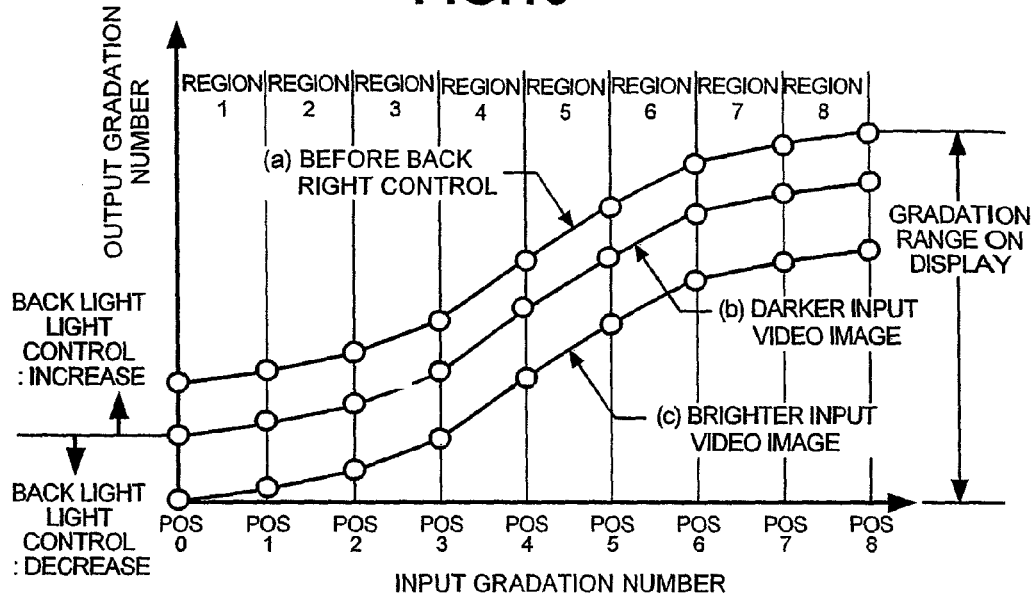
FIG. 16 is a conceptional diagram for illustrating the amount of control of light for a back light in the second embodiment according to this invention.

FIG. 16 illustrates the concept used for control of the amount of light produced by the back light. The amount of light produced by the back light is controlled by the result of detection of the average luminance by the input video image characteristic detection sections 13-15. The average luminance is obtained by calculating the luminance value Y from the inputted video data and determining the average for the luminance value Y for one frame. In the second embodiment, the amount of light produced by the back light is increased when the average luminance is high and the amount of light produced by the back light is decreased when the average luminance is low. Then, in addition to the constitution of the first embodiment for displaying the input video data through gradation conversion on a liquid crystal display by controlling the amount of the back light in accordance with the average luminance, the apparent luminance can further be increased or decreased as shown in FIG. 16. This provides a feature which makes the brightness/darkness conspicuous on the video image display to display dynamic video images.

Figure 17:
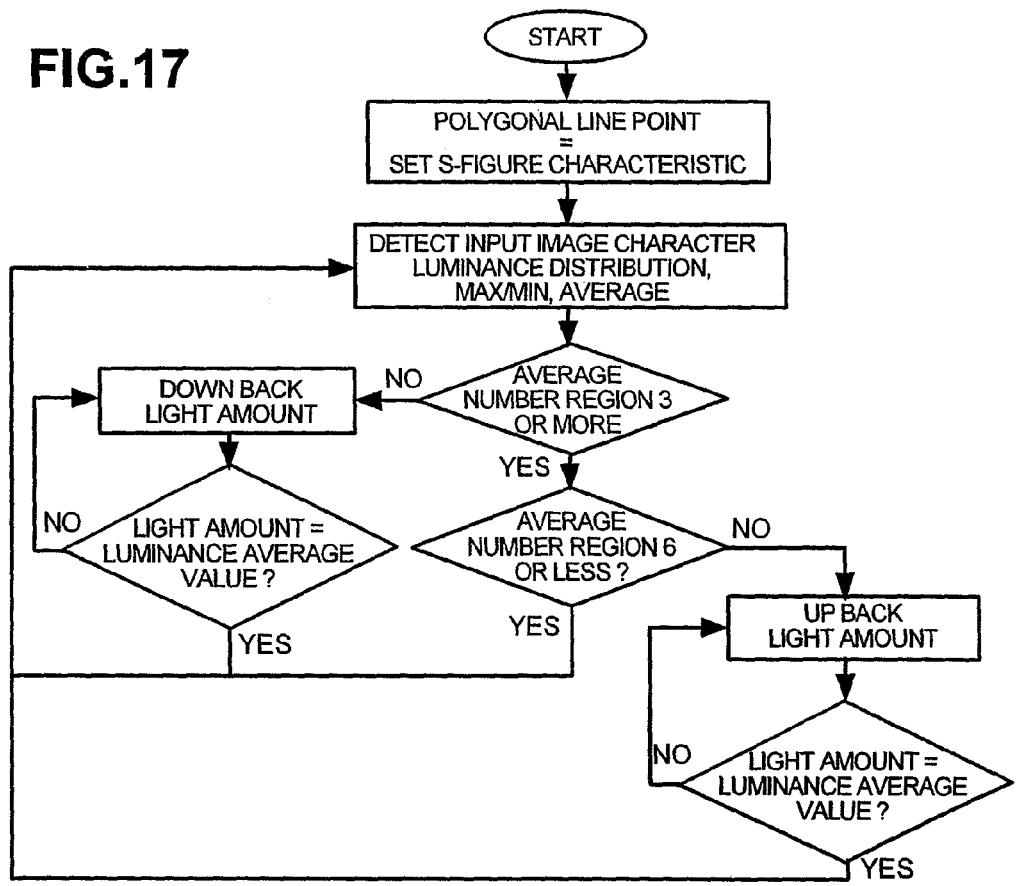
FIG. 17 is a flow chart showing the control of the amount of light for a back light in the second embodiment according to this invention.

FIG. 17 is a flow chart showing an example of the back light controlling operation according to this embodiment. At first, polygonal line point set values are set to the polygonal point generation sections 16-18 by the microcomputer 23 and the microcomputer control section 24. The polygonal line points set in this case are as explained for the first embodiment. Further, the average value of the luminance of the input image data is determined simultaneously by the input video image characteristic detection sections 13-15. The microcomputer 23 conducts processing as indicated by the flow chart shown in FIG. 17 in accordance with the average value of the luminance. At first, the microcomputer 23 confirms whether the average luminance value is higher than the gradation in the region 3 or not. If it is not higher than the region 3, the input image data is judged to be darker and the amount of the back light is decreased by the back light control section 65. For determining the extent the light amount is to be decreased, it is assumed, for example, that the accuracy for the determined average luminance is 256 gradations (8 bit) and the light control range of the back light is also 256 steps (8 bit) and the point at which the control value for the back light agrees with the average luminance data is defined as a satisfactory display state. Since the input video image characteristic detection sections 13-15 update the detection data by the interval determined by the detection setting section 26, the back light is controlled again in accordance therewith. In this case, the data detecting interval is defined as one frame. If the average value for the detected luminance is higher than that of the region 3, it is then confirmed whether the value is lower than that of the region 6 or not. If it is lower than that of the region 6, the detected average luminance is, after all, higher than the region 3 and lower than the region 6, so that the light amount produced by the back light in response to the back light control section 65 is not controlled. On the contrary, if it is judged to be not lower than that of the region 6, the input video data is judged to consist of brighter video images and the amount of the back light is increased by the same algorithm as used in controlling the darker video images. That is, since an appropriate amount of the back light can be obtained in accordance with the video data, video images can be displayed clearly.

As described above, the second embodiment, in which the amount of light of the back light is controlled in accordance with the average luminance of the video signals, has an effect capable of effectively utilizing light emitted from the back light. Since the liquid crystal does not emit light by itself, but controls the amount of light passing through the liquid crystal in accordance with the display data, a back light is necessary for the display. However, since the back light always has to emit light during the display of data, and, particularly, if the display content is a dark video image scene, most of the light from the back light is shielded by the liquid crystal, which is not preferred from the view point of the efficiency for utilizing light. However, according to the second embodiment of this invention, since the amount of light produced by the back light is increased or decreased in accordance with the average luminance, the amount of light produced by the back light is decreased for darker video images, while the amount of light produced by the back light is increased for brighter video images. Accordingly, the efficiency of utilizing the amount of light produced by the back light can also be improved, or the electric power consummation for operating the back light can also be reduced.

As described above, according to this invention, the gradation characteristic can be set in accordance with the gradation distribution characteristic and the maximum luminance and the minimum luminance of the input video data in every frame period; and, particularly, by emphasizing the contrast of the gradation distribution region of the highest generation frequency, video images can be displayed clearly. Further, it is possible to produce a display while utilizing the contrast characteristic of the display device to the utmost in accordance with the maximum luminance and the minimum luminance.

Further, a liquid crystal module capable of optimally setting the gradation characteristic by itself in accordance with the input video signal can be attained by incorporating the circuits of this embodiment in the liquid crystal module.

Furthermore, by controlling the amount of light produced by the back light in accordance with the average luminance of video signals, the efficiency of utilizing the light produced by the back light can be increased and the electric consumption power for emitting the back light can be reduced.

A third embodiment according to this invention will be explained with reference to FIG. 18 through FIG. 24. The third embodiment is an example of a liquid crystal display device for conducting gradation correction in accordance with the video image characteristic described for the first embodiment, having a more concrete constitution of detecting the luminance distribution and conducting gradation correction in accordance therewith, and conducting the gradation correction without using the microcomputer control section 24.

At first, each of the drawings used for the explanation of the third embodiment will be outlined and reference numerals depicted in each of them will be explained.

Figure 18:
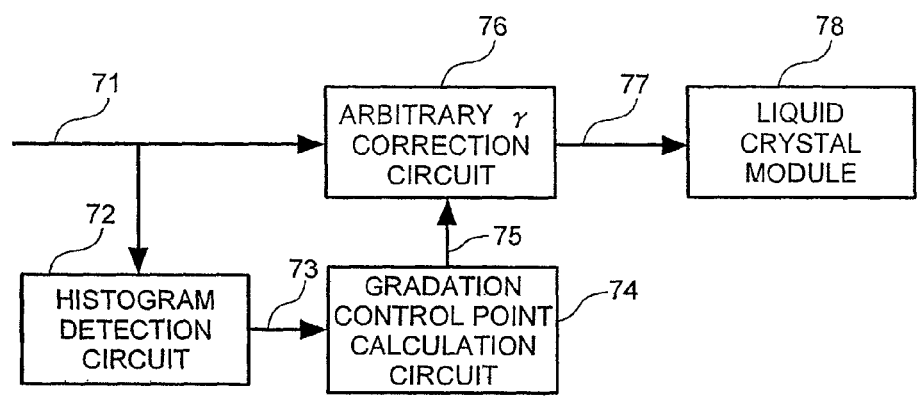
FIG. 18 is a block diagram of a system for a liquid crystal display device representing a third embodiment according to this invention.

FIG. 18 is a block diagram of the third embodiment of the liquid crystal display device according to this invention, in which there are a color video signal 71 sent from a signal source such as a personal computer or TV tuner, a histogram detection circuit 72 for detecting the distribution of the brightness in one frame of the color video signal 71, a histogram value 73 outputted from the histogram detection circuit 72, a gradation control point calculation circuit 74 for calculating the gradation control point for γ-correction from the histogram value 73, a gradation control point 75 calculated by the gradation correction point calculation circuit 74, an arbitrary curve γ-correction circuit 76 for correcting the gradation of the color video signal 71 by an arbitrary curve from the gradation control point 75, color display data 77 subjected to gradation correction by the arbitrary curve γ-correction circuit 76 and a liquid crystal module 78 for color display of color display data 77.

Figure 19:
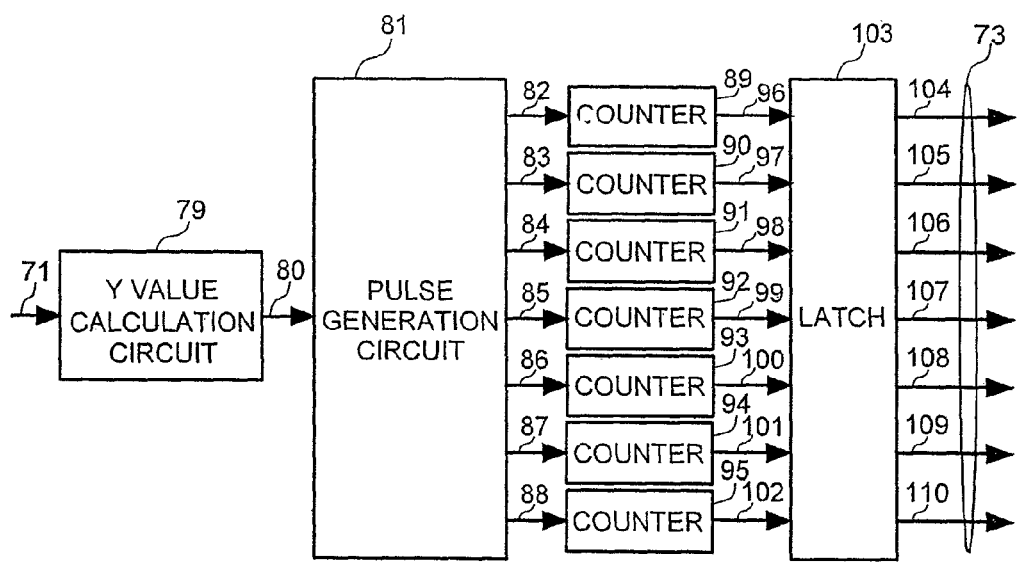
FIG. 19 is a block diagram of a histogram detection circuit in the third embodiment according to this invention.

Further, FIG. 19 is a diagram illustrating the constitution of the histogram detection circuit 72 in FIG. 18, in which are shown a Y value calculation circuit 79 for calculating the Y value representing the brightness of the color video signal 71 and a Y value 80 calculated by the Y value calculation circuit 79. There is a pulse generation circuit 81 which generates one of a plurality of pulse signals 82, 83, 84, 85, 86, 87 and 88 in accordance with the y value. Counters 89, 90, 91, 92, 93, 94 and 95 count up the plurality of pulse signals, respectively, and each of the others is cleared on every 1 frame. The number of pulses on every frame can be counted up. The reference numerals 96, 97, 98, 99, 100, 101 and 102 each represents the counted value counted up by the counter and reference numeral 103 denotes a latch, which latches each of the counted values on every one frame and holds its temporarily. Each of reference numerals 104, 105, 106, 107, 108, 109 and 110 denotes a latched counted value, which is the histogram value 73 described above.

Figure 20:
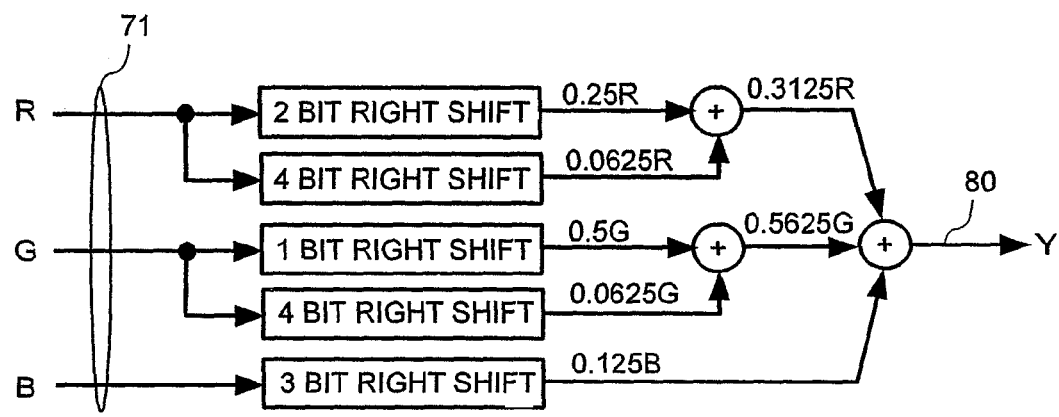
FIG. 20 is a schematic diagram of a Y-value calculation circuit in the third embodiment according to this invention.

Further, FIG. 20 is a diagram illustrating an example of the Y value calculation circuit 79 in FIG. 19. When the R video signal is shifted rightward by 2 bits, a 0.25 R signal is outputted, and when the R video signal is shifted rightward by 4 bits, a 0.0625 R signal is outputted. When the 0.25 R signals and 0.625 R signals are added, a 0.3125 R signal is outputted. When the G video signal is shifted rightward by one bit, a 0.5 R signal is outputted, and when the G video signal is shifted rightward by 4 bits, a 0.0625 G signal is outputted. When the 0.5 G signal and the 0.0625 G signal are added, 0.5625 G signal is outputted. When the B video signal is shifted rightward by 3 bits, a 0.125 B signal is outputted. Then, when the 0.3125 R signal, 0.5625 G signal and 0.125 B signal are added, a luminance signal (Y) is obtained.

Figure 21:
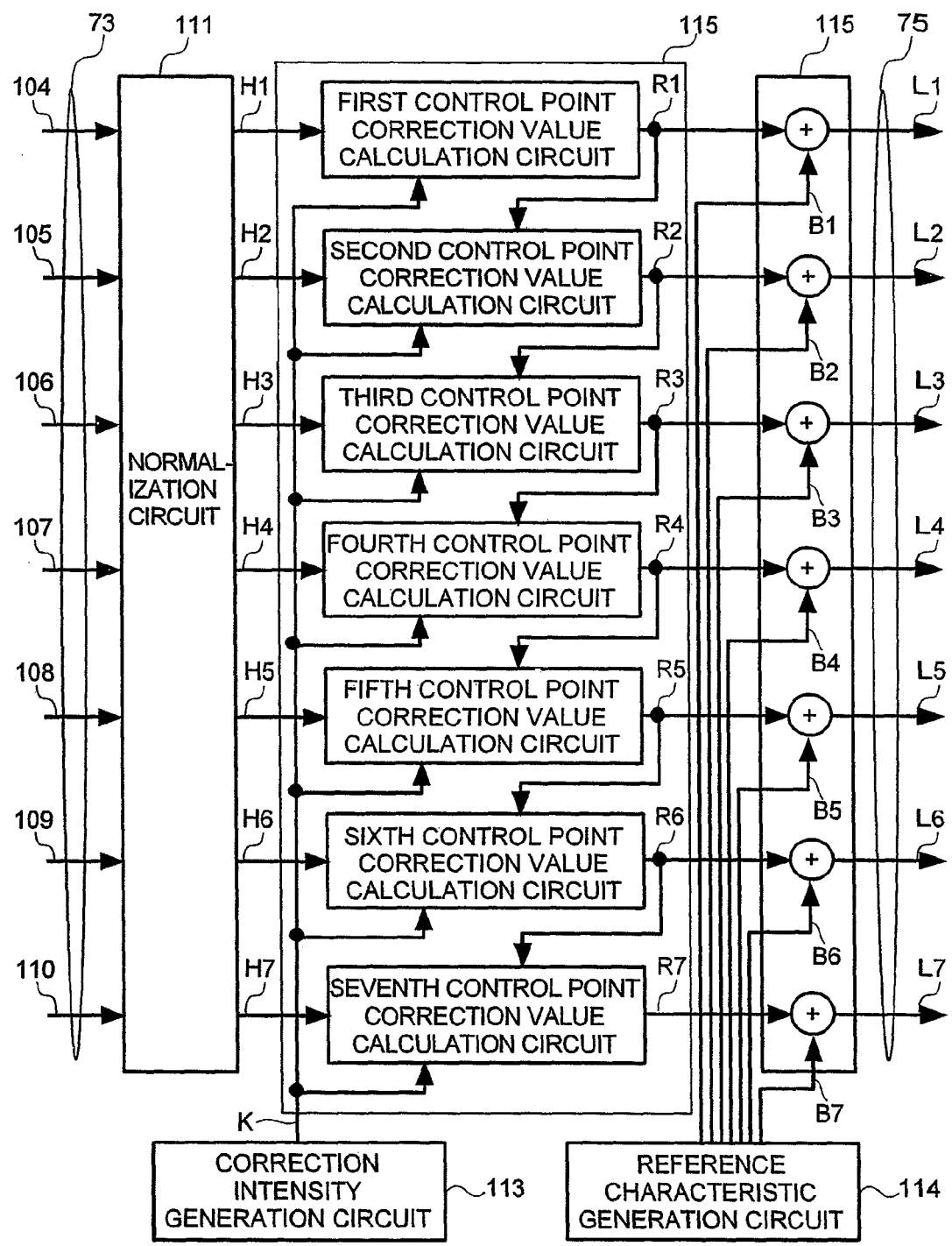
FIG. 21 is a schematic block diagram of a gradation control point calculation circuit in the third embodiment according to this invention.
Figure 22:
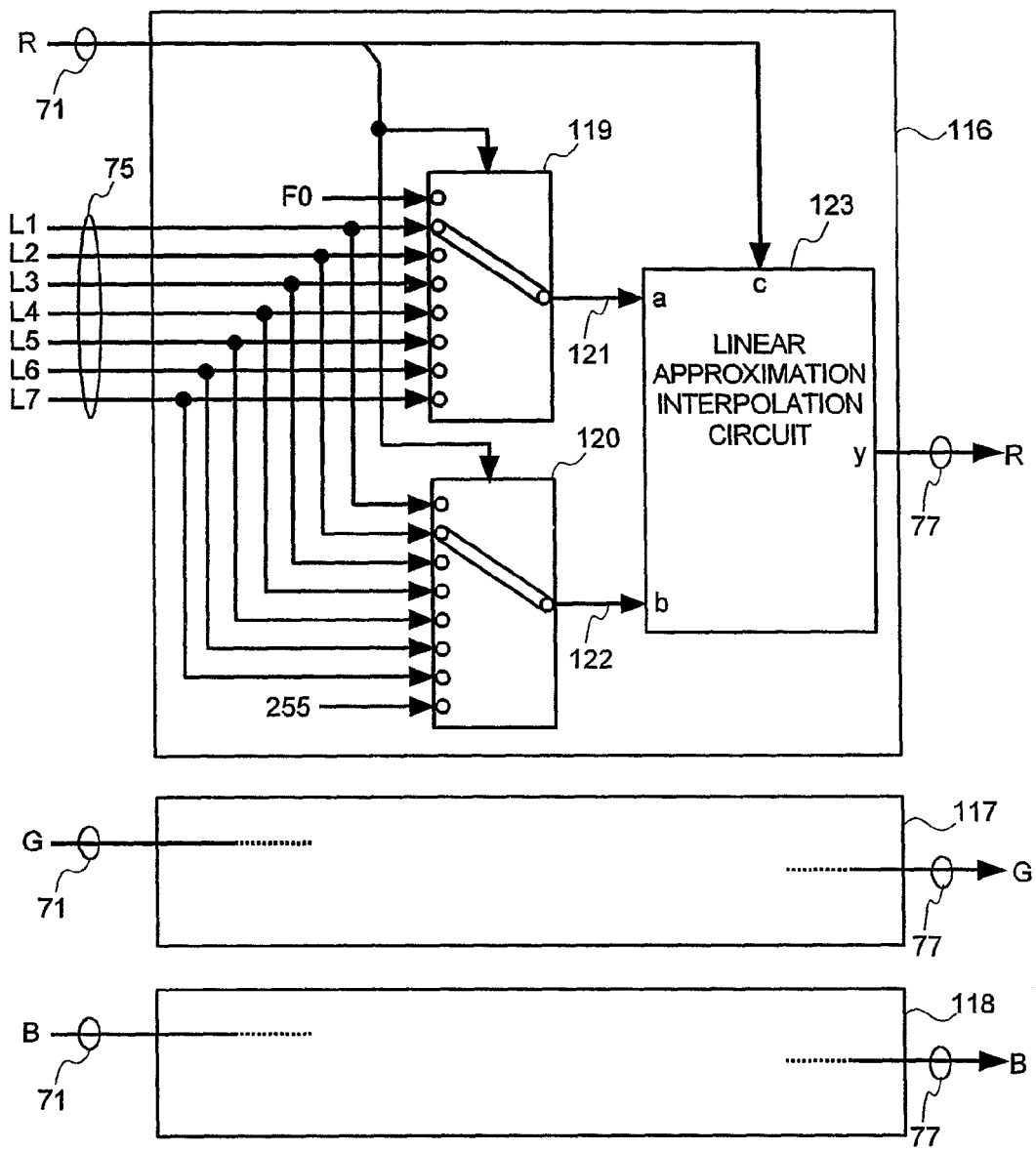
FIG. 22 is a schematic diagram of an arbitrary curve γ-correction circuit in the third embodiment according to this invention.

Further, FIG. 21 is a view illustrating the constitution of the gradation control point calculation circuit 74 in FIG. 18, in which there are a normalizing circuit 111 for normalizing the histogram value 73 for the brightness of the color video signal in one frame detected by the histogram detection circuit 72 to a constant average value, a correction value calculation circuit 112 for calculating a correction value from the normalized histogram value, a correction intensity generation circuit 113 for generating a correction intensity k representing the intensity of correction, a reference characteristic generation circuit 114 for generating a gradation correction characteristic as a reference, and an adder 115, in which the output of the adder 115 forms the gradation control point 75. Further, FIG. 22 is a diagram illustrating the constitution of the arbitrary curve γ-correction circuit 76 in FIG. 18, in which each of the polygonal line approximation circuits 116, 117 and 118 conducts gradation conversion of the color display data 71 constituted with RGB, which conducts gradation conversion and then outputs the color display data 77 constituted with RGB. Further, FIG. 22 shows details of a circuit only for the R color in the color video signals 71 constituted with RGB. Since circuits for G color and B color can be constituted in an identical manner, they are not illustrated. There are also selectors 119, 120 controlled by the higher 3 bits of the R color video signals for selecting the correction coefficient 5, control points 121, 122 each selected by the selector 119, 120 and a linear approximation interpolation circuit 123 that conducts calculation using the lower 5 bits of the R color video signal and control points 121, 122.

Figure 23:
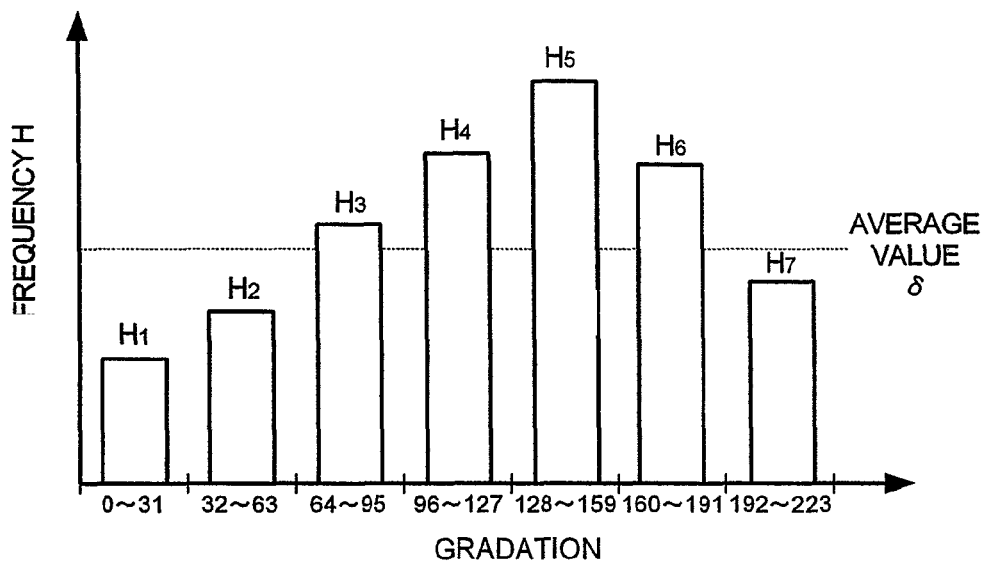
FIG. 23 is a graph for a histogram value outputted from a histogram detection circuit in the third embodiment according to this invention.
Figure 24:
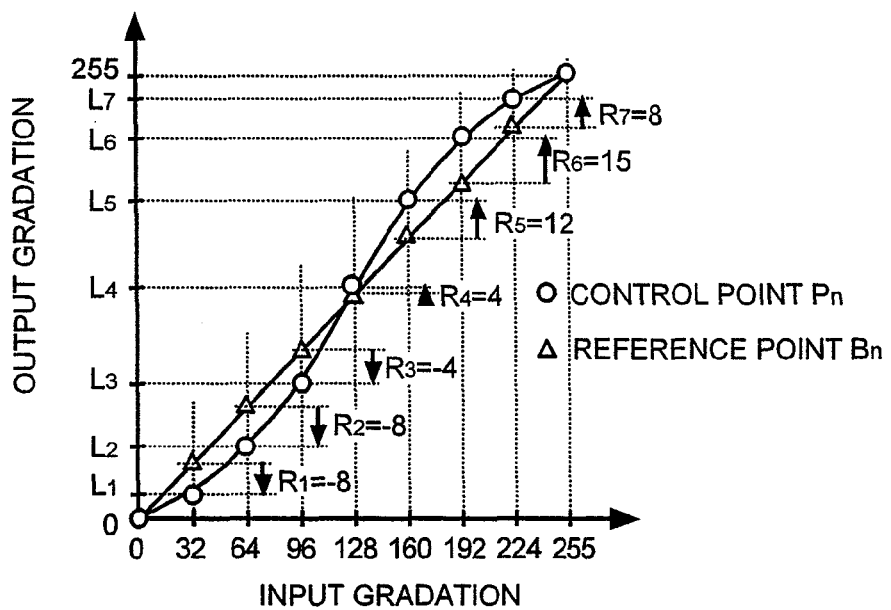
FIG. 24 is a graph illustrating a relation between an input gradation and an output gradation of an arbitrary curve γ-correction circuit in the third embodiment according to this invention.

Further, FIG. 23 is a graph for the histogram value 73 outputted from the histogram detection circuit 72 in FIG. 18. Further, FIG. 24 is a graph for the relation between the input gradation and output gradation of the arbitrary curve γ-correction circuit 76 in FIG. 18.

The operation of the third embodiment will be explained. In FIG. 18, the color video signal 71 is color data representing RGB, which is color display data including video signals outputted from a personal computer and video signals in connection with television broadcasting, as well as video signals regenerated from VTR and DVD, video images photographed by video cameras and video images prepared by computer graphics. The color video signal 71 is inputted to each of the histogram detection circuit 72 and the arbitrary γ-correction circuit 76. The histogram detection circuit 72 examines the frequency distribution of the brightness of the color video signals 71 in one frame and outputs the result as the histogram value 73 to the gradation control point calculation circuit 74. The gradation control point calculation circuit 74 calculates the gradation control point 75 for the correction of the gradation characteristic given to the arbitrary curve γ-correction circuit 76 based on the histogram value 73 and outputs the same to the arbitrary curve γ-correction circuit 76. The arbitrary curve γ-correction circuit 76 conducts gradation correction on the color video signal 71 such that the relation between the input gradation and the output gradation forms a characteristic determined by the gradation control point 75 and outputs the result as the color display data 77 to the liquid crystal module 78.

Details for the operation of the histogram detection circuit 72 be explained with reference to FIG. 19, FIG. 20 and FIG. 23. FIG. 19 is a detailed view of the histogram detection circuit 72. The color video signal 71 inputted to the histogram detection circuit 72 is calculated for the Y value showing the brightness of the color video signal 71 in the Y value calculation circuit. In this embodiment, the color video signal 71 is an RGB color signal and each of RGB comprises digital 8 bit data (256 gradation). Then, the Y value is defined as:

$$Y=0.299R+0.587G+0.114B,$$

and the Y value is calculated from the RGB signals in accordance with the above mentioned equation. The Y value has a digital value of 8 bits.

By the way, referring to the practical calculation for the equation described above, an approximation calculation circuit as shown in FIG. 20 may be used for approximation of the multiplication of a real number constant added to each of the RGB values. Generally, the circuit scale of the multiplier is large, and, particularly, since this is a real number multiplier, the scale is extremely increased. However, the scale of the circuit can be reduced by using an approximation for the calculation of the Y value, that is, approximation by bit shifting and addition instead of multiplication, while taking advantage of the fact that each of RGB has an 8 bit digital value. In the approximation calculation circuit in FIG. 20, the R color is calculated, for example, by adding the result of rightward shifting by 2 bits and rightward shifting by 4 bits to produce a 0.3125 R color signal. In the same manner, as shown in FIG. 20, 0.5625 G color data and 0.125 B color data are prepared by bit shifting and addition and finally adding all of them to determine the Y value 80. The thus obtained Y value 80 is then inputted to the pulse generation circuit 81.

The pulse generation circuit 81 is adapted to output one of the pulse signals 82 to 88 in accordance with the Y value 80, and details of the operation are shown In Table 1.

TABLE 1

| SECTION | Y VALUE 80 | PULSE OUTPUT |
|---|---|---|
| 1 | 0-31 | PULSE SIGNAL 82 |
| 2 | 32-63 | PULSE SIGNAL 83 |
| 3 | 64-95 | PULSE SIGNAL 84 |
| 4 | 96-127 | PULSE SIGNAL 85 |
| 5 | 128-169 | PULSE SIGNAL 86 |
| 6 | 160-191 | PULSE SIGNAL 87 |
| 7 | 192-223 | PULSE SIGNAL 88 |
| 8 | — | — |

As shown in Table 1, pulse signal 82 is outputted when Y value 80 is 0-32, a pulse signal 83 is outputted when Y value 80 is 33-64, and in the same manner, pulse signals are outputted corresponding to the Y value 80. As described above, since the Y value 80 has a 8 bit digital value, its possible range is from 0 to 255. As will be described later in connection with this embodiment, the range for the value of the Y value 80 is equally divided into 8 portions in accordance with the number of control points for conducting gradation correction of polygonal line approximation, and the value is divided on every 32 stages and the pulse is outputted in accordance with the Y value 80. In Table 1, there is no description for the portion corresponding to the section 8 in which the Y value 80 takes values between 224 and 255. The circuit is not illustrated since the section 8 can be determined of itself when the section 1-section 7 are determined exactly. That is, when the display resolution is, for example, 640×480 picture elements, since the total number of picture elements is 307,200, it can be determined based on the total number of picture elements if the total number of pulses from section 1 to section 7 are known. As will be described later, the circuit corresponding to the section 8 is omitted, since there is no effect on the operation of this embodiment, as will be described later.

As described above, the pulse generation circuit 81 outputs pulse signals 82-88 to the counters 89-95, respectively, in accordance with the Y value 80. Each of the counters 89-95 counts up the pulses corresponding to section 1-section 7 for the Y value 80. The value for each of the number of counted up pulses is temporarily held by a latch 103 in every one frame, which is outputted as the histogram value 73. FIG. 23 shows an example of the histogram value 73 as a graph. As shown in FIG. 23, the generation frequency of the Y value 80 is counted up in every section to obtain the frequency distribution for the brightness of the color video signal in one frame.

Further, referring to the histogram in FIG. 23, the gradations of the sections H4, H5 and H6 of high frequency make up a large portion in the color video signal 71 of the relevant frame and take up a large area on the display screen when the color video signal 71 is displayed. On the other hand, the gradations of the sections HI and H2 of low frequency have less ratio on the display screen. Accordingly, the display can be made conspicuous by emphasizing the contrast of the display data in the gradation section taking up a large display area and suppressing the contrast of the display data in the gradation section having less ratio in the display area. Then, the gradation characteristic may be determined directly from the frequency distribution of the histogram to convert the gradation characteristic of the display data.

The operation of the circuit for calculating the gradation control point 75 from the histogram value 73 will be explained with reference to FIG. 21. FIG. 21 is a diagram of the gradation control point calculation circuit 74. The histogram value 73 obtained as described above is inputted to the normalizing circuit 111. The sum of the frequency for each of the histogram values 73 is equal with the display resolution; and, for example, the sum of the frequency is 307,200 in the case of a resolution of 640×480 dots. Since the histogram value 73 is obtained as each frequency by equally dividing 0-255 that the Y value 80 can take into 8 portions, the simple average for the frequency in each of the sections is 38, 400, that is, ⅛ for the sum of the frequencies. The normalization circuit 111 is a circuit for normalizing the value of 38400 of the simple average into 32. The frequency of each of the sections of the normalized histogram is expressed as normalized frequency HI-H7 as shown in FIG. 21. Further, the simple average for the frequency after normalization is 32, which is expressed as $\delta$.

Then, the normalized frequencies HI-H7 are inputted together with the correction intensity k from the correction intensity generation circuit 113 into the correction value calculation circuit 112 and the gradation correction values R1-R7 for the gradation conversion are calculated. The correction value calculation circuit 112 Is constituted with first to seventh correction value calculation circuits, and each of the calculation circuits conducts a calculation in accordance with the following equations.

$$R_1 = K(H_1 - \delta)$$

$$R_2 = K(H^2 - \delta) + R_1$$

$$R_3 = K(H_3 - \delta) + R_3$$

$$R_4 = K(H_4 - \delta) + R_4$$

$$R_9 = K(H_6 - \delta) + R_6$$

$$R_7 = K(H_7 - \delta) + R_6$$

In the equations described above, the variant in each of them is determined as described with reference to FIG. 21 and the equation represents the face that the differences of the normalizing frequencies HI-H7 relative to the average $\delta$ of the frequency form the gradation correction values R1-R7. Accordingly, when the value for the normalizing frequencies HI-H7 is greater than the average $\delta$, the gradation correction values R1-R7 are positive; and, when the value for the normalizing frequency HI-H7 is smaller than the average $\delta$, the gradation correction values R1-R7 are negative. Further, since the correction intensity k is added as a coefficient to each of the equations, the magnitude of the gradation correction values R1-R7 can be changed by increasing or decreasing the value of the correction intensity k. With such calculation, the gradation correction values R1-R7 are calculated and inputted to each of the adders 115.

The adder 115 is an addition calculator for correcting the reference points B1-B7 of the gradation characteristic as a reference formed by the reference characteristic generation circuit 114 with the gradation correction values R1-R7 calculated by the correction value calculation circuit 112, and the values after the addition form gradation control points L1-L7. The reference points B1-B7 for the gradation characteristics show the gradation characteristic as the reference for gradation correction of the color video signals 71, and a gradation characteristic is set to the reference in accordance with the histogram of the brightness.

The operation of the gradation control point calculation circuit 74 as described above is shown by concrete numerical values in Table 2.

TABLE 2

| CONTROL POINT | NORMALIZATION FREQUENCE Hn | CORRECTION INTENSITY K | GRADATION CORRECTION VALUE Rn | REFERENCE POINT Bn | GRADATION CONTROL Ln |
|---|---|---|---|---|---|
| P1 | 15 | 0.5 | −8 | 32 | 24 |
| P2 | 32 |  | −8 | 64 | 56 |
| P3 | 40 |  | −4 | 96 | 92 |
| P4 | 48 |  | 4 | 128 | 132 |
| P5 | 49 |  | 12 | 160 | 172 |
| P6 | 38 |  | 15 | 192 | 207 |
| P7 | 18 |  | 8 | 224 | 232 |
|  | 16 |  |  |  |  |

Average Value of Normalization Frequency: δ=32 (Constant)

Table 2 shows the operation of the gradation control point calculation circuit 74 for calculating the gradation from the histogram detected in one frame of the color video signal 71 numerical values. An example of the values of the frequencies HI-H8 of the normalized histograms are as shown in Table 2. The average value δ for the frequencies HI-H8 is 32. The correction value calculation circuit 112 conducts a calculation for HI-H7 among the normalizing frequencies HI-H8 in accordance with the equation 2. That is, when the correction intensity k is 0.5, the gradation correction values R1-R7 are calculated from each of the normalizing frequencies HI-H7 as shown in Table 2. On the other hand, the reference points B1-B7 show the characteristic as the reference for gradation conversion of the color video signal 71 and the gradation characteristic is corrected relative to the reference characteristic. The reference points B1-B7 in Table 2 have such values that the reference characteristic takes on a linear characteristic. The gradation correction values R1-R7 are added respectively to the reference points B1-B7 to calculate the gradation control points LI-L7. The thus calculated gradation control points LI-L7 are outputted to the arbitrary curve γ-correction circuit 76.

The operation of the arbitrary curve γ-correction circuit 76 for gradation correction of the inputted color video signal 71 by using the calculated gradation control points LI-L7 will be explained with reference to FIG. 22. The arbitrary γ-correction circuit 76 comprises three polygonal line approximation circuits 116, 117 and 118 each of which conducts gradation conversion of the color video signal for each of RGB colors. In each of the polygonal line approximation circuits, the operation is explained here only for the R color circuit. Since the circuits for the C color and B color perform the same operation, explanations therefor are omitted. In FIG. 22, the R color video signal is an 8 bit (256 gradation) video signal in which the higher 3 bits are inputted as a selection control signal for the selectors 119 and 120. On the other hand, the lower 5 bits of the R color video signal are inputted to the linear approximation interpolation circuit 123, the data for the lower 5 bits of the R color video signal is expressed by symbol c. The R color video signal of the higher 3 bits inputted to the selector 119, 120 selects the gradation control points L1-L7 and a fixed value "O" F0 or a fixed value "255" F255 in accordance with the truth value in Table 3.

TABLE 3

| VIDEO IMAGE SIGNAL UPPER 3 BIT | SELECTOR 119 OUTPUT | SELECTOR 120 OUTPUT |
|---|---|---|
| 000 | FIXED VALUE "0" | L1 |
| 001 | L1 | L2 |

TABLE 3-continued

| VIDEO IMAGE SIGNAL UPPER 3 BIT | SELECTOR 119 OUTPUT | SELECTOR 120 OUTPUT |
|---|---|---|
| 010 | L2 | L3 |
| 011 | L3 | L4 |
| 100 | L4 | L5 |
| 101 | L5 | L6 |
| 110 | L6 | L7 |
| 111 | L7 | FIXED VALUE "255" |

The selected signals are inputted as control points 121 and 122 to the linear approximation interpolation circuit 123. The control point 121 is expressed as a and the control point 122 is expressed as b. Based on the thus selected control points a and b and the data c for the lower 5 bits of the R color video signal, the linear approximation interpolation circuit 123 outputs the R color gradation data after gradation correction calculated in accordance with the following equation:

$$y = a + (b-a) \cdot c/32$$

The inputted color video signal 71 is subjected to gradation conversion by the linear approximation interpolation circuit 123 defined by the equation described above and outputted as the color display data 77 to the liquid crystal module 78 and the images are displayed. As described above, the arbitrary curve γ-correction circuit 76 shown in FIG. 22 converts the color video signal 71 into arbitrary gradation characteristic by the input of the gradation control point 75 and outputs the same as the color display data 77 as shown in FIG. 22. Further, the gradation conversion characteristic is explained with reference to FIG. 24.

FIG. 24 shows an example of the γ-correction characteristic when the gradation conversion circuit according to this invention is applied to the reference characteristic having a linear characteristic. Description will be made also with reference to Table 2. Since the reference characteristic is linear, each of the reference points B1-B7 takes a value as shown in Table 2, and it is set such that the output gradation (reference point B1) is "32" for the input gradation "32" and the output gradation (reference) point B2) is "64" for the input gradation "gradation 64" and so on. According to the embodiment of this invention, the γ correction characteristic of polygonal line approximation is controlled by the control points PI-P7. The polygonal line approximation γ-characteristic obtained by increasing or decreasing the control points PI-P7 in accordance with the gradation correction values R1-R7 with respect to the reference points B1-B7 constitutes the gradation conversion characteristic. In Table 2, gradation control points L1-L7 are calculated by correcting the reference points B1-B7 with the gradation correction values R1-R7, and the gradation characteristic obtained by the gradation control points L1-L7 form control points PI-P7 in FIG. 24. After applying such gradation characteristic to the inputted color video signal 71 to conduct gradation conversion, they are outputted as the color display data 77 to the liquid crystal module 78.

As described above, according to the third embodiment, the display can be made conspicuous by emphasizing the contrast for the gradation of the section of higher frequency on the histogram and suppressing the contrast for the gradation of the section of lower frequency in accordance with the brightness histogram of the inputted color video signal 71. In addition, since the contract control is conducted corresponding to the color video signal, it can also cope with versatile video signals. Particularly, in video signals, such as for dynamic images where video scenes change sequentially, since optimum contrast control can always be applied, display can be conducted at an optimum image quality while considering the display characteristic and contrast of the liquid display device.

A fourth embodiment according to this invention will be explained with reference to FIG. 18, FIG. 19, and FIG. 25 to FIG. 28. In summary, the fourth embodiment has a feature capable of performing gradation correction by changing the characteristics of the histogram detection circuit 72 in the third embodiment, while taking the gradation characteristic inherent to the liquid crystal also into consideration. At first, explanation will be made for each of the drawings and reference numerals depicted in each of them. Explanations of the reference numerals already explained for FIG. 18 and FIG. 19 are omitted.

Figure 25:
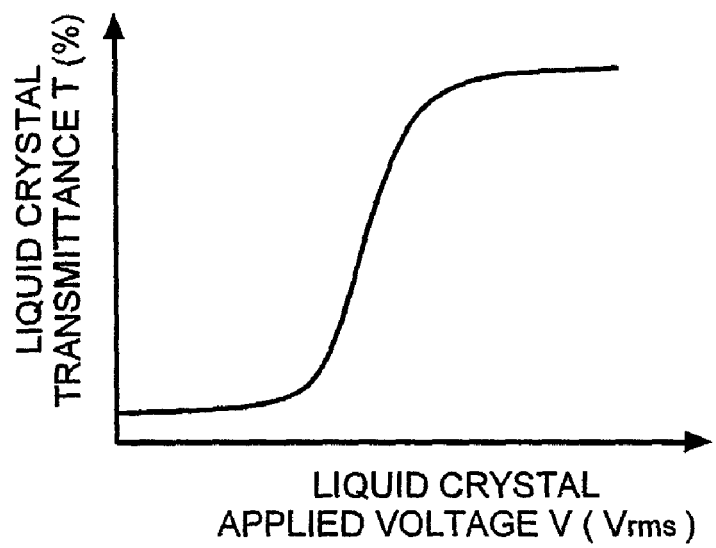
FIG. 25 is a graph illustrating a relation between the amount of light transmitting a liquid crystal and an electric signal (voltage effective value) of a liquid crystal display device in the third embodiment according to this invention.

FIG. 25 is a graph illustrating a relation between the amount of light transmitting the liquid crystal of the liquid crystal display device and electric signals (effective voltage value).

Figure 26:
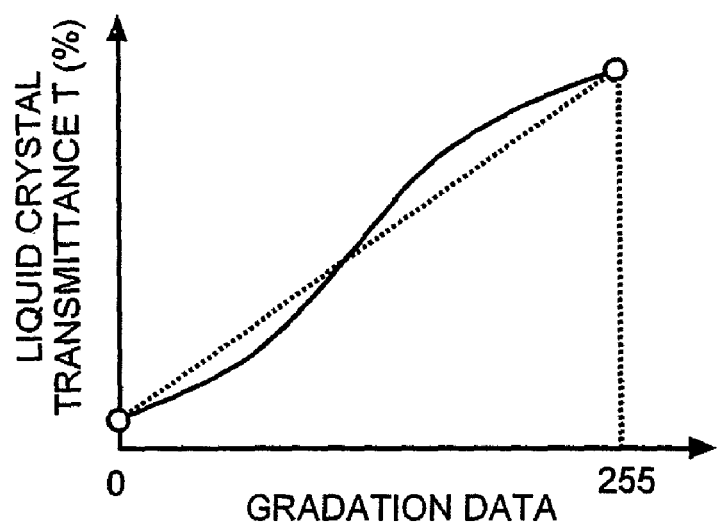
FIG. 26 is a graph illustrating a relation between input display data (gradation data) and a transmission ratio of light of a liquid crystal display device in the third embodiment according to this invention.

FIG. 26 is a graph illustrating a relation between the input display data (gradation data) to the liquid crystal display device and the light transmittance in the liquid crystal.

Figure 27A:
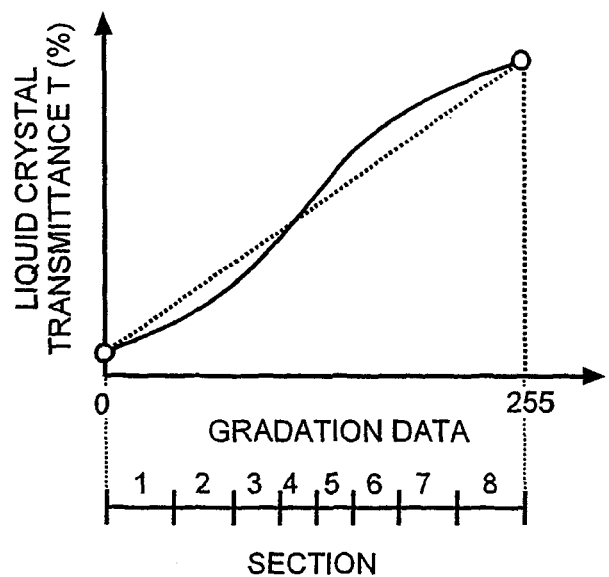
FIG. 27A and FIG. 27B are graphs illustrating the state of changing sections in each histogram distribution relative to a relation between the input (gradation data) and the transmission ratio of light of a liquid crystal of a liquid crystal display device in the third embodiment according to this invention.
Figure 27B:
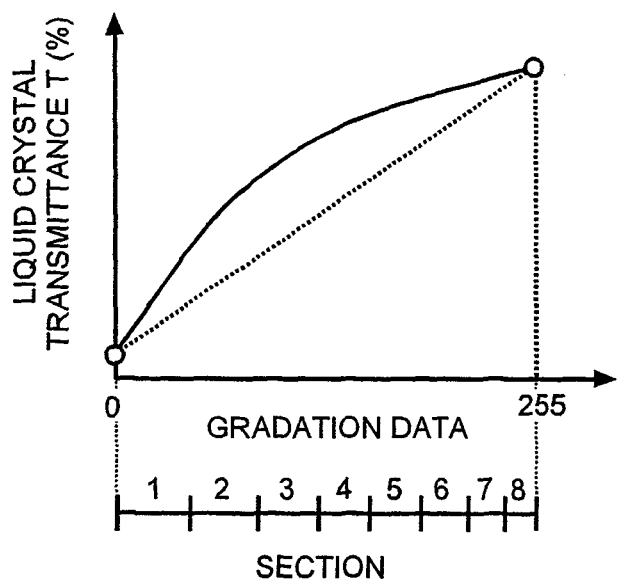

FIG. 27A and FIG. 27B are graphs showing the state of changing the section for each of the histogram distributions relative to the relation between the input (gradation data) of the liquid crystal display device and the light transmittance in the liquid crystal.

Figure 28:
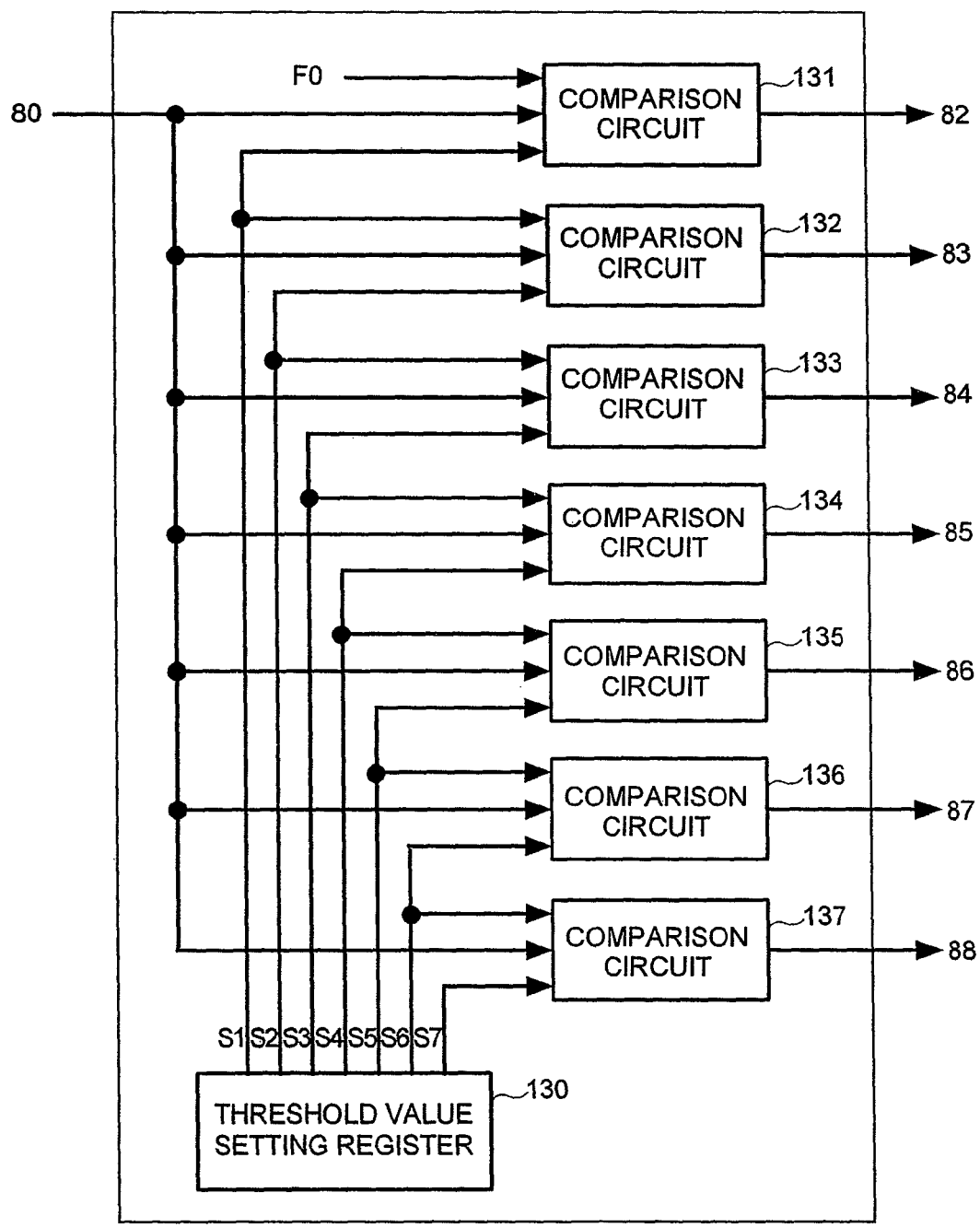
FIG. 28 is a block diagram of a pulse generation circuit in a fourth embodiment according to this invention.

FIG. 28 is a view showing a detailed constitution of the pulse generation circuit 81 in FIG. 19 for constituting the second embodiment, in which there are a threshold value setting resistor 130, which is a circuit for generating threshold values S1-S7 as a reference for comparison with the Y value 80, and comparison circuits 131-137 for comparing the Y value 80 with the threshold values S1-S7, thereby to output pulses corresponding to the values determined in the threshold values S1-S7.

The operation of the fourth embodiment according to this invention will be explained.

FIG. 25 shows a relation between the amount of light transmitting the usual liquid crystal and a voltage applied to the liquid crystal (effective voltage value), in which the transmittance of the liquid crystal has an inverted S-shaped characteristic which saturates both at higher and lower transmittance areas. As described above, the liquid crystal has a nature of changing the transmittance of light; and, in the liquid crystal display device, a light source (back light) is disposed at the back of the liquid crystal to utilize this characteristic. The light from the back light is passed through the liquid crystal and the brightness is changed by controlling the transmittance of the light in the crystal. Accordingly, the characteristic for the brightness of the liquid crystal display device is substantially equivalent to the characteristic shown in FIG. 25, providing that the transmittance of the liquid crystal on the ordinate is taken as the brightness of the liquid crystal display device in the characteristic chart.

The display information for the display of the liquid crystal display device is given as the display data (gradation data). Most of the display data are those having a bit width capable of expressing multi-gradations, such as 6 bits (64 gradation) or 8 bits (256 gradation). Accordingly, for conducting display based on the display data, the liquid crystal display device incorporates a driver circuit for converting the display data into a liquid crystal application voltage. The driver circuit establishes a relation between the display data (gradation data) and the transmittance of the liquid crystal as shown in FIG. 26. In most of liquid crystal devices, the inverted S-shaped liquid crystal transmittance characteristic is adjusted by the driver circuit such that the relation between the display data and the transmittance of the liquid crystal is substantially linear. However, the straight line sometimes will include curve portions due to scattering of the transmittance characteristic of the liquid crystal, as shown in FIG. 26. Then, for further correcting the transmittance characteristic of the liquid crystal, the histogram detection circuit 72 in FIG. 18 has a constitution as shown in FIG. 28.

In FIG. 28, a threshold setting register 130 outputs a plurality of threshold values S1-S7 to comparison circuits 131-137 for comparison with the Y value 80. Further, the value for each of the threshold values S1-S7 is freely set. The comparison circuits 131-137 compare the Y value 80 with the threshold values S1-S7 and output pulse signals 82-88 in accordance with each of the results of comparison. The operation of the comparative circuits 131-137 is shown in Table 4.

TABLE 4

| SECTION | Y VALUE 80 | | PULSE OUTPUT |
|---|---|---|---|
| 1 | 0 ≦ VALUE < S1 | 0-39 | PULSE SIGNAL 82 |
| 2 | S1 ≦ VALUE < S2 | 40-72 | PULSE SIGNAL 83 |
| 3 | S2 ≦ VALUE < S3 | 73-101 | PULSE SIGNAL 84 |
| 4 | S3 ≦ VALUE < S4 | 102-128 | PULSE SIGNAL 85 |
| 5 | S4 ≦ VALUE < S5 | 129-155 | PULSE SIGNAL 86 |
| 6 | S5 ≦ VALUE < S6 | 156-184 | PULSE SIGNAL 87 |
| 7 | S6 ≦ VALUE < S7 | 185-218 | PULSE SIGNAL 88 |

As shown in Table 4, the comparative circuit 131 outputs a pulse signal 82 when the Y value 80 is 0 or more and less than S1; the comparison circuit 132 outputs a pulse signal 83 when the Y value 80 is SI or more and less than S2; the comparison circuit 133 outputs a pulse signal 84 when the Y value 80 is S2 or more and less than S3; and, in the same manner, each of the comparison circuits outputs a pulse signal in accordance with each of the threshold values. Accordingly, the threshold values S1-S7 represent a boundary value that defines each of the sections. Further, Table 4 also describes an example for the setting value of the threshold values S1-S7. As shown by the example of the setting value in Table 4, the threshold values S1-S7 for dividing the Y value 80 into 8 sections are arranged each at an uneven interval. This is for correcting the gradation characteristic of the liquid crystal itself, in which the slope to the gradation data is small at high and low transmittance areas and the slope is large at an intermediate transmittance area, as shown in FIG. 26. Therefore, it is necessary to provide the gradation characteristic as shown in FIG. 27A, for which the threshold values S1-S7 are set such that the width for the threshold value is wider for the sections with smaller Y value 80 and the width for the threshold value is narrower for the section with intermediate Y value 80. Therefore, the frequency is relatively higher in the sections with smaller and larger Y value 80 relative to the section with the intermediate Y value 80. The γ-correction circuit of this invention serves to determine the gradation characteristic in accordance with the frequency in each of the sections of the histogram and emphasize the contrast of the section as the frequency is higher, as has been described for the third embodiment. Accordingly, the γ-correction circuit operates so as to correct the gradation correction itself to the liquid crystal having the gradation characteristic shown in FIG. 26; and, as a result, a linear gradation characteristic can be provided for the liquid crystal display device.

Further, not only for adjusting the threshold values S1-S7 to the gradation characteristic of the liquid crystal, but also for making the entire gradation brighter, as shown, for example, in FIG. 27 B, it is set to such a characteristic that the entire gradation characteristic is brighter relative to the linear characteristic. For this purpose, the threshold values S1-S7 are set such that the width of the threshold value is wider in the section with a smaller Y value 80 and the width of the threshold value is gradually narrowed toward the section with larger Y value 80. In such an arrangement, the frequency is relatively higher in the section with smaller Y value 80 relative to the section with larger Y value 80 and this functions to emphasize the contrast more in the gradation with smaller Y value 80, that is, the dark gradation. Accordingly, the gradation characteristic is set such that the entire gradation is brighter, thereby to obtain a liquid crystal display device of bright display.

As described above, according to the fourth embodiment of this invention, since gradation correction can be applied while taking the gradation characteristic inherent to the liquid crystal also into consideration by changing the setting for the threshold values S1-S7 of the histogram detection circuit 72, it is possible to provide a display having a linear gradation characteristic as the liquid crystal display device. Further, it is possible to obtain a gradation characteristic capable of optionally setting the brightness as the liquid crystal display device.

A fifth embodiment according to this invention will be explained with reference to FIG. 29 and FIG. 30. The fifth embodiment is for moderating an abrupt change of the gradation correction characteristic of the arbitrary curve γ-correction circuit 76 due to the change of the video image scenes in the dynamic image display in which the video image scenes change currently.

At first, each of the drawings is outlined and reference numerals depicted in each of them will be explained. Those portions carrying the same reference numerals as in the third and the fourth embodiments have already been explained and duplicate explanations therefor will be omitted.

Figure 29:
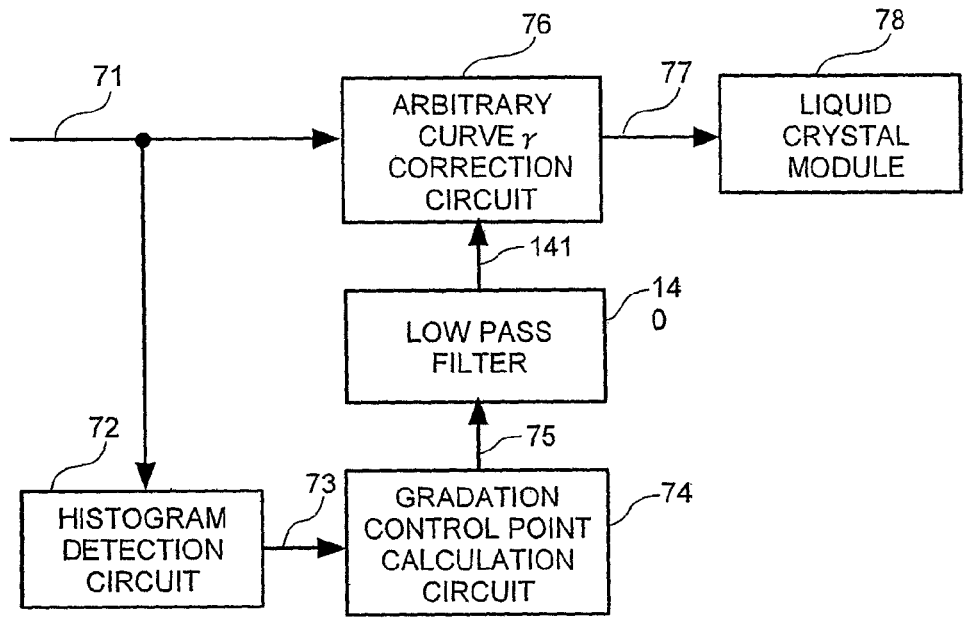
FIG. 29 is a block diagram of a system of a liquid crystal display device representing a fifth embodiment according to this invention.

FIG. 29 is a block diagram of a liquid crystal display device according to the fifth embodiment, in which there are a low-pass filter 140 for moderating the change of the value to a gradation control point 75 and a gradation control point 141 moderated for the change, in which the gradation control point 141 is inputted for gradation correction to the arbitrary curve γ-correction circuit 76, which also has been explained for the third and fourth embodiments.

Figure 30:
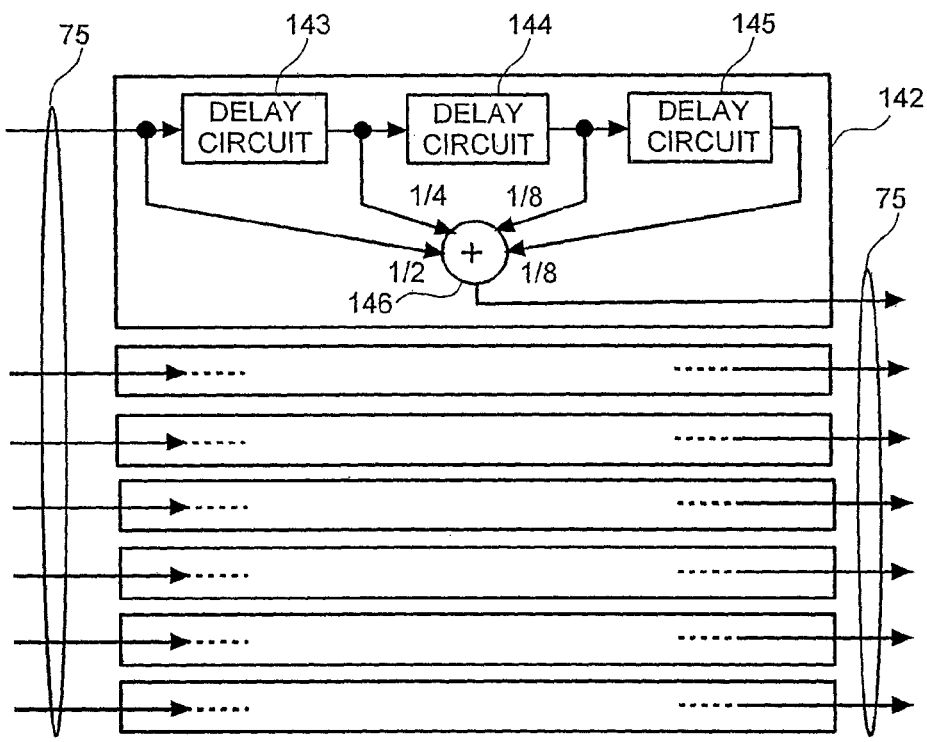
FIG. 30 is a schematic diagram of a low-pass filter circuit in the fifth embodiment according to this invention.

FIG. 30 is a detailed view of the low-pass filter 140, in which there are a digital filter 142, delay circuits 143, 144 and 145 for delaying the period by one frame, respectively, and an adder 146 operating under weighting. In FIG. 30, a digital filter for the gradation control point L1 is illustrated. Since the constitution is identical also for digital filters for the other gradation control points L2-L7, their duplicated explanations will be omitted.

The operation of the fifth embodiment will be explained.

In FIG. 30, an original gradation control point L1 inputted to the digital filter 142 is inputted to the delay circuit 143. Then, for the original gradation control point L1, the delay circuit 143 outputs the gradation control point L1 delayed by one frame to the adder 146 and also to the delay circuit 144. Further, the delay circuit 144 outputs the gradation control point L1 delayed by 2 frames relative to the original gradation control point L1 to the adder 146 and also to the delay circuit 145. Further, the delay circuit 145 outputs the gradation control point L1 delayed by 3 frames to the original gradation control point L1 to the adder 146. Then, the adder 146 conducts addition under weighting for each of the delayed gradation control points LI. That is, all of them are added while weighting ½ to the original gradation control point LI, weighting ¼ to the gradation control point L1 delayed by 1 frame and weighting ⅛ to each of the gradation control point L1 delayed by 2 frames and to the gradation control point L1 delayed by 3 frames, respectively. Concrete examples of numerical values will be explained with reference to Table 5.

TABLE 5

| FRAME | ORIGINAL GRADA-TION POINT | OUTPUT OF DELAY CIRCUIT 143 | OUTPUT OF DELAY CIRCUIT 144 | OUTPUT OF DELAY CIRCUIT 145 | OUTPUT OF ADDER CIRCUIT 146 |
|---|---|---|---|---|---|
| ½ | ½ | ½ | ½ | ½ | ½ |
| 1 | 15 | 15 | 15 | 15 | 15 |
| 2 | 15 | 15 | 15 | 15 | 15 |
| 3 | 50 | 15 | 15 | 15 | 31 |
| 4 | 50 | 50 | 15 | 15 | 41 |
| 5 | 50 | 50 | 50 | 15 | 45 |
| 6 | 50 | 50 | 50 | 50 | 50 |
| 7 | 50 | 50 | 50 | 50 | 50 |
| ½ | ½ | ½ | ½ | ½ | ½ |

Table 5 shows the original gradation control point L1 and each of the delayed gradation control points and the values for the output from the adder 146 In every frame, assuming a case that the value "15" of the gradation control point L1 up to first and second frames is abruptly changed to "50" at and after the third frame. As can be seen in Table 5, the output from each of the delay circuits 143, 144 and 145 is delayed each by one frame. Then, the delayed gradation control points are added each under weighting in the adder 146 and the output from the adder 146 takes values as shown in Table 5. As a result, an abrupt change in the value of the original gradation control point from "15" to "50" between the second frame and the third frame is moderated as "15", "31", "41", "45", "50" from the second frame to the sixth frame. The value of the moderated gradation control point is outputted as a new gradation control point to the arbitrary curve γ-correction circuit 76.

As described above, an abrupt change of the gradation correction curve along with a change of the video image scenes can be moderated by the use of the low-pass filter 140; and, particularly, since the gradation correction curve also changes the characteristic gradually relative to currently changing video images, such as of dynamic images, smooth video images can be displayed.

A sixth embodiment of this invention will be explained with reference to FIG. 31. The sixth embodiment is an example of a circuit for conducting gradation correction after storing the color video signal once in a frame memory and delaying the same by 1 frame.

Figure 31:
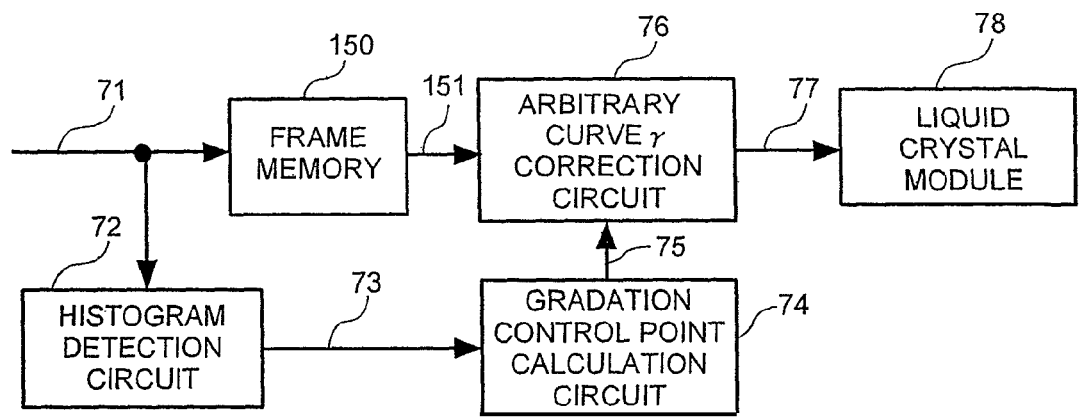
FIG. 31 is a block diagram of a system of a liquid crystal display device representing a sixth embodiment according to this invention.

FIG. 31 is a block diagram of a liquid crystal display device to which the sixth embodiment according to this invention is applied, in which there are a frame memory 150 for delaying the color video signal 71 by one frame period and a color video signal 151 delayed by one frame. Since other portions are identical with those already explained for the third and fourth embodiments, duplicate explanations are to be omitted.

The operation of the sixth embodiment will be explained. In FIG. 31, inputted color video signal 71 is inputted to each of a histogram detection circuit 72 and a frame memory 150. The histogram detection circuit 72 detects the histogram showing the frequency of the brightness of the color video signal 71, thereby to output a histogram value 73 as described for the first and second embodiments. Then, a gradation control point 75 is calculated based on the histogram value 73 by a gradation control point calculation circuit 74 to determine the gradation correction characteristic of an arbitrary curve γ-correction circuit 76. The histogram detection circuit 72 detects the histograms of the color video signal 71 of the frame successively; and, after all of the color video signals 71 of the frame have been inputted for one frame, the detected histogram value 73 is latched and outputted. Accordingly, when the histogram value 73 is outputted, since the color video signal 71 of the frame next to the relevant frame is inputted, the histogram value 73 is delayed by one frame in view of the time relative to the color video signal 71. Accordingly, the gradation control point outputted from the gradation control point calculation circuit 74 is also delayed by one frame and determination for the gradation correction characteristic of the arbitrary curve γ-correction circuit 76 is also delayed by one frame.

In view of the above, the color video signal 71 is stored by using the frame memory 150 and then the color video signal 151 is outputted, after delay for one frame period, to the arbitrary curve γ-correction circuit 76. Both of the color video signal 151 and the gradation control point 75 inputted to the arbitrary curve γ-correction circuit 76 are delayed by one frame. Since the gradation control point 75 is calculated based on the color video signal 151 delayed by one frame, the gradation characteristic of the color video signal 151 of the relevant frame is aligned as it is in view of the time and reflected on the gradation control point 75, which constitutes the gradation correction characteristic of the arbitrary curve γ-correction circuit 76.

As described above, in the sixth embodiment, since the frame memory for delaying the color video signal by one frame is provided, the gradation correction characteristic is determined based on the gradation characteristic of the color video signal of the relevant frame, so that gradation correction at a higher accuracy can be applied to attain a liquid crystal display device of high image quality.

A seventh embodiment according to this invention will be explained with reference to FIG. 32. The seventh embodiment is an example of application, not to the color video signal in which the color video signal 71 represents RGB colors, but to a color video signal in which it is represented by a Y/C signal (Y: brightness, C: color difference).

Figure 32:
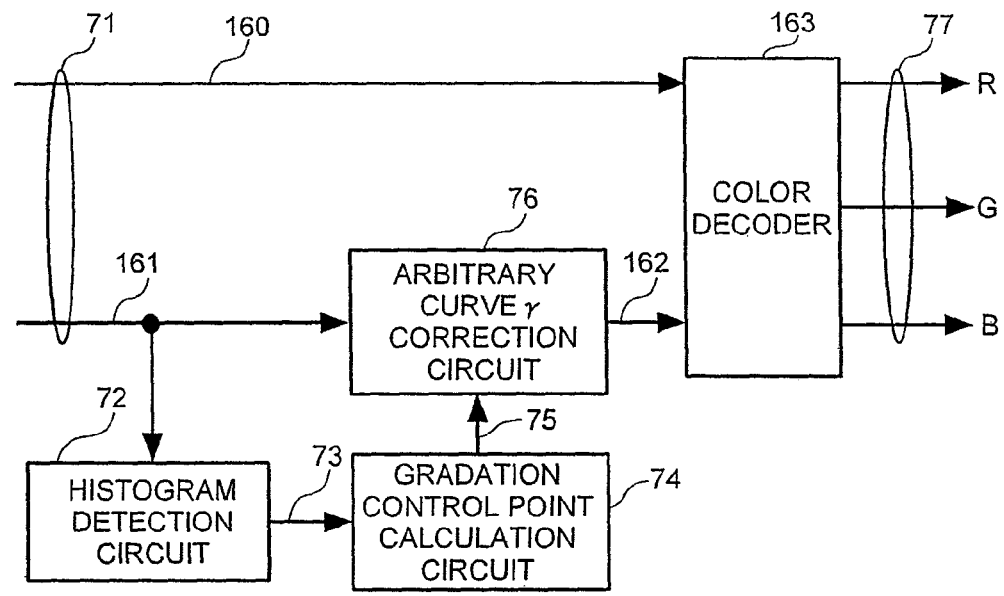
FIG. 32 is a block diagram of a system of a liquid crystal display device representing a seventh embodiment according to this invention.

FIG. 32 is a block diagram of a liquid crystal display device to which the seventh embodiment according to this invention is applied and in which there are a color difference signal 160 and a brightness signal 161, and the color video signal 71 comprises the color difference signal 160 and the brightness signal 161. The reference numeral 162 denotes a brightness signal undergoing gradation correction and reference numeral 163 denotes a color decoder for converting the color difference signal 160 and the brightness signal 162 into RGB color signals. The color decoder 163 is identical with a so-called RGB matrix circuit incorporated generally in television receivers for converting Y/C signals into RGB signals.

The operation of the seventh embodiment will be explained. The color difference signal 160 of the color video signal 71 is inputted to the color decoder 163. On the other hand, the brightness signal 161 is inputted to the histogram detection circuit 72 and the arbitrary curve γ-correction circuit 76. The histogram detection circuit 72 is identical with that shown in FIG. 19 in the same manner as for the third embodiment, but the Y value calculation circuit 79 in FIG. 19 not necessary since the inputted signal is already the brightness signal 161. Accordingly, the brightness signal 161 inputted to the histogram detection circuit 72 is directly inputted to the pulse generation circuit 81. The histogram detection circuit 72 detects the histogram showing the frequency of the brightness of the color video signal 71 and outputs the histogram value 73 as already described for FIG. 3 for the third and the fourth embodiments. Then, the gradation control point 75 is calculated based on the histogram value 73 in the gradation control point calculation circuit 74 to determine the gradation correction characteristic of the arbitrary curve γ-correction circuit 76. Then, the brightness signal 161 is corrected for the gradation characteristic by the arbitrary curve γ-correction circuit 76. Then, the arbitrary curve γ-correction circuit 76 newly outputs the same as a brightness signal 162 to the color decoder 163. The arbitrary curve γ-correction circuit 76 is identical with that shown in FIG. 22 like that for the third embodiment; however, since the inputted signal already consists only of the brightness signal 161, only one system may suffice for the polygonal line approximate circuit. The color decoder 163 converts the brightness signal 162 and the color difference signal 160 under gradation correction as described above into the RGB color display data 77. Then, the color display data 77 is inputted into the liquid crystal module 78 to display the images.

As described above, according to the seventh embodiment of this invention, gradation correction is applied in accordance with the histogram of the brightness of the relevant frame relative to the brightness signal and applies no correction at all to the color difference signal, so that change of hue or color spreading due to the gradation correction does not occur, and the gradation correction can be applied at high accuracy only for the brightness component to attain a liquid crystal display device of high image quality.

An eighth embodiment according to this invention will be explained with reference to FIG. 33. The eighth embodiment is an example of a constitution incorporating a histogram detection circuit 72, a gradation control point calculation circuit 74, and an arbitrary curve γ-collection circuit 76 in a liquid crystal module.

Figure 33:
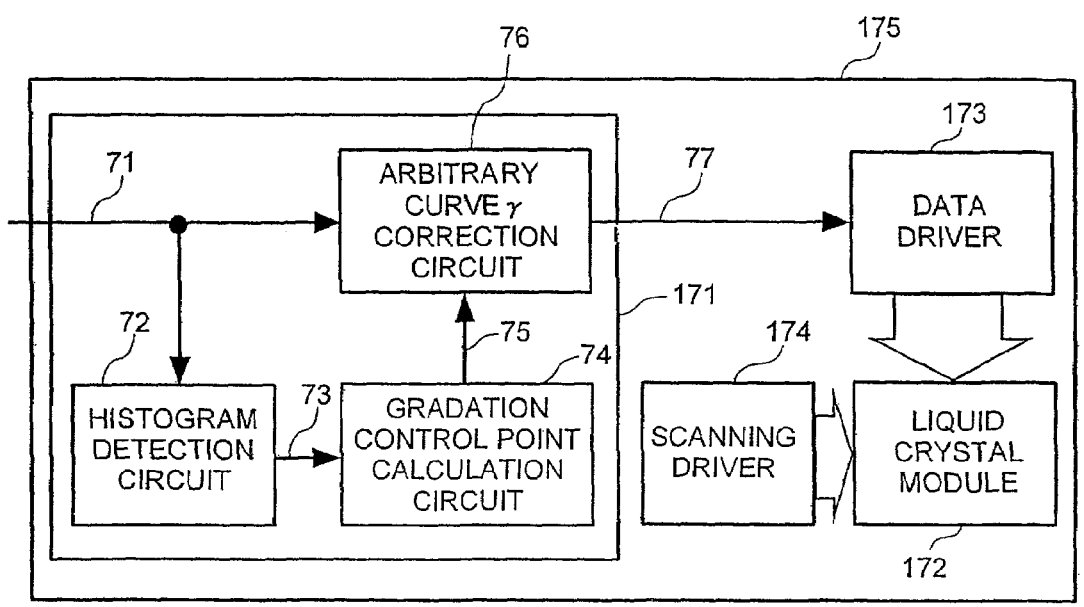
FIG. 33 is a block diagram of a system of a liquid crystal display device representing an eighth embodiment according to this invention.

At first, FIG. 33 will outlined and reference numerals therein explained. FIG. 33 is a block diagram of a liquid crystal display device to which the eighth embodiment according to this invention is applied and in which there are an interface circuit 171 comprising a histogram detection circuit 72, a gradation control point calculation circuit 74 and an arbitrary curve γ-correction circuit 76, a liquid crystal panel 172 in which picture elements are arranged in matrix, a data driver 173 for outputting a gradation driving voltage for the display of the liquid crystal panel 172 corresponding to the color display data 77, a scanning driver 174 for outputting a scanning voltage for the display of the liquid crystal panel 172, and a liquid crystal module 175 comprising the interface circuit 171, the liquid crystal panel 172, the data driver 173 and the scanning driver 174. Since other portions are identical with those already explained for the third embodiment, duplicate explanations will be omitted.

The operation of the eighth embodiment will be explained. In FIG. 33, the interface circuit 171 applies gradation conversion to the color video signal 71 into the color display data 77 and outputs the same to the data driver 173. The color video signal 71 inputted to the interface circuit 171 is inputted to the histogram detection circuit 72 and also to the arbitrary curve γ-correction circuit 76. The color video signal 71 is inputted to the histogram detection circuit 72, which examines the frequency distribution of the brightness of the color video signal 71 in one frame and outputs the result as the histogram value 73 to the gradation control point calculation circuit 74. The gradation control point calculation circuit 74 calculates the gradation control point 75 for the gradation characteristic correction provided to the arbitrary curve γ-correction circuit 76 based on the histogram value 73 and outputs the same to the arbitrary curve γ-correction circuit 76.

The arbitrary curve γ-correction circuit 76 applies gradation correction to the color video signal 71 such that the relation between the input gradation and the output gradation forms a characteristic determined by the gradation control point 75 and outputs the same as the color display data 77 to the data driver 173. The data driver 173 is a circuit for converting the inputted color display data 77 into the liquid crystal driving voltage and for outputting the same to the liquid crystal panel 102 for display. On the other hand, the scanning driver 174 selects and scans the picture elements arranged in a matrix on every row and applies a liquid crystal driving voltage outputted from the data driver 173 to each of the picture elements present in the row selected by the scanning driver 174 to conduct display on the liquid crystal panel 102.

Since the operation of the interface circuit 171 is identical with that of the histogram detection circuit 72, the gradation control point calculation circuit 74 and the arbitrary curve γ-correction circuit 76 of the first embodiment, duplicate detailed explanations are omitted. It is possible to make the display conspicuous on the liquid crystal panel 172 by emphasizing the contrast of the gradation for the section of higher frequency and suppressing the contrast of the gradation for the section of low frequency in accordance with the histogram corresponding to the histogram of the color video signal 71 inputted from the interface circuit 171. In addition, since the contrast control is conducted corresponding to the color video signal, it can also cope with various kinds of video signals. Particularly, since optimal contrast control can always be conducted also for the video signals, such as of dynamic images in which video scenes change currently, display is possible at the optimum image quality while considering the display characteristic or the contrast of the liquid crystal panel 172. In addition, since the interface circuit 171 is incorporated together with the liquid crystal panel 172, the data driver 173 and the scanning driver 174 in the liquid crystal module 175, the liquid crystal module, particularly, optimal to the display of the dynamic images can be constituted in a compacted manner.

The first to eighth embodiments described above can be practiced also in combination with each other.

For example, the fifth and sixth embodiments can be combined by inserting the low-pass filter 140 of FIG. 29 between the gradation control point calculation circuit 74 and the arbitrary curve γ-correction circuit 76 in the circuit shown in FIG. 31. In this embodiment, since a frame memory used for delaying the color video signal by one frame is provided, the gradation correction characteristic is determined based on the gradation characteristic of the color video signal in the frame, so that gradation correction at a higher accuracy can be conducted. In addition, provision of the low-pass filter can moderate the abrupt change of the gradation correction curve along with the change of the video image scenes; and, particularly, since the gradation correction curve also changes the characteristic gradually relative to the currently changing video images, such as of dynamic images, smooth video images can be displayed and a liquid crystal display device of high picture quality can be attained.

Further, in the seventh embodiment, the inputted color video signal 71 is the Y/C signal. As a modified embodiment, the inputted color video signal 71 may be a RGB signal and a color encoder for converting the inputted RGB signal first into the Y/C signal may be provided and the Y/C signal outputted from the color encoder may be formed as the color video signal 71 in FIG. 32. In this modification of the seventh embodiment, since the gradation correction is conducted in accordance with the brightness histogram in the frame relative to the brightness signal and no correction is applied to the color difference signal, a change of hue or color spreading does not occur and the gradation correction can be conducted at a high accuracy only for the brightness component to attain a liquid crystal display device of high image quality.

Further, the interface circuit 101 of the eighth embodiment may be replaced with the circuit according to the fourth to seventh embodiments in addition to constituting the same with the circuit shown in FIG. 18 for the third embodiment. In this case, since the interface circuit 171 is incorporated together with the liquid crystal panel, the data driver and the scanning driver in the liquid crystal module, a liquid crystal module particularly optimal to the display of dynamic images can be constituted in a compact manner.

As described above, the embodiments according to this invention operate so as to emphasize the contrast of the gradation in the section of high frequency and suppress the contrast of the gradation in the section of low frequency in view of the histogram corresponding to the brightness histogram of the inputted color video signal, whereby the display can be made conspicuous. In addition, since the contrast control is conducted corresponding to the color video signal, it can cope with versatile video signals. Particularly, since optimal contrast control can always be conducted also for video signals such as for dynamic images in which video image scenes change currently, display can be conducted at optimal image quality in view of the display characteristic and the contrast of the liquid crystal display device, and a liquid crystal display device of high image quality can be attained.

In addition, since the gradation correction also in view of the gradation characteristic inherent to the liquid crystal can be conducted by making the setting for the threshold value of the histogram detection circuit variable, it is possible to provide for display of the linear gradation characteristic as the liquid crystal display device. Further, it is possible to obtain a gradation characteristic capable of freely setting the brightness as the liquid crystal display device by the setting of the threshold value.

The present invention is not limited to the above embodiments and various changes and modifications can be made within the spirit and scope of the present invention. Therefore, to appraise the public of the scope of the present invention, the following claims are made.

What is claimed is:

1. A liquid crystal display device for displaying video data, comprising:
    a detection circuit for detecting a histogram of gradations for each of divided regions based on video data which is inputted, each divided region including a plurality of gradations;
    a determination circuit for determining at least one of a plurality of divided regions of higher generation frequency of gradation on the histogram than that of other divided regions based on the histogram;
    a correction circuit for correcting the video data so as to make a luminance characteristic of the at least one of the plurality of divided regions of higher generation frequency of gradation on the histogram more abrupt than a luminance characteristic of the other divided regions; and
    a liquid crystal display panel for displaying the corrected video data;
    wherein a width of the divided region becomes narrower as a light transmittance of a liquid crystal of the liquid crystal display device becomes greater.

2. A liquid crystal display device for displaying video data, comprising:
    a detection circuit for detecting a histogram of gradations for each of divided regions based on video data which is inputted, each divided region including a plurality of gradations;
    a determination circuit for determining at least one of a plurality of divided regions of higher generation frequency of gradation on the histogram than that of other divided regions based on the histogram;
    a correction circuit for increasing an output gradation number against an input gradation number of the at least one of the plurality of divided regions of higher generation frequency of gradation on the histogram more than an output gradation number against an input gradation number of other divided regions, to correct the video data; and
    a liquid crystal display panel for displaying the corrected video data;
    wherein a width of the divided region becomes narrower as a light transmittance of the liquid crystal of the liquid crystal display device becomes greater.

3. A liquid crystal display device for displaying video data, comprising:
    a detection circuit for detecting a histogram of gradations for each of divided regions based on the video data which is inputted, each divided region including a plurality of gradations;
    a determination circuit for determining at least one of a plurality of divided regions of higher generation frequency of gradation on the histogram than that of other divided regions based on the histogram;
    a correction circuit for correcting the video data so as to emphasize contrast of the at least one of the plurality of divided regions of higher generation frequency of gradation more than contrast of the other divided regions; and
    a liquid crystal display panel for displaying the corrected video data;
    wherein a width of the divided region becomes narrower as a light transmittance of the liquid crystal of the liquid crystal display device greater.

* * * * *